(12) United States Patent
Hong

(10) Patent No.: US 9,619,708 B2
(45) Date of Patent: Apr. 11, 2017

(54) METHOD OF DETECTING A MAIN SUBJECT IN AN IMAGE

(71) Applicant: NIKON CORPORATION, Tokyo (JP)

(72) Inventor: Li Hong, San Diego, CA (US)

(73) Assignee: NIKO CORPORATION (JP)

( * ) Notice: Subject to any disclaimer, the term of this patent is extended or adjusted under 35 U.S.C. 154(b) by 218 days.

(21) Appl. No.: 14/387,528

(22) PCT Filed: Mar. 12, 2013

(86) PCT No.: PCT/US2013/030433
§ 371 (c)(1),
(2) Date: Sep. 23, 2014

(87) PCT Pub. No.: WO2013/165565
PCT Pub. Date: Nov. 7, 2013

(65) Prior Publication Data
US 2015/0055824 A1    Feb. 26, 2015

Related U.S. Application Data

(60) Provisional application No. 61/640,627, filed on Apr. 30, 2012.

(51) Int. Cl.
*G06K 9/34*    (2006.01)
*G06K 9/46*    (2006.01)
(Continued)

(52) U.S. Cl.
CPC ....... *G06K 9/00624* (2013.01); *G06K 9/3241* (2013.01); *G06K 9/4652* (2013.01);
(Continued)

(58) Field of Classification Search
None
See application file for complete search history.

(56) References Cited

U.S. PATENT DOCUMENTS

2002/0126891 A1    9/2002   Osberger
2006/0098889 A1    5/2006   Luo et al.
(Continued)

OTHER PUBLICATIONS

The International Preliminary Report on Patentability, Nov. 4, 2014, Nikon Corporation, PCT/US13/30433. (related application).
(Continued)

*Primary Examiner* — Sean Conner
(74) *Attorney, Agent, or Firm* — Roeder & Broder LLP; Steven G. Roeder

(57) ABSTRACT

A method for detecting a main subject in an image comprises the steps of: (i) computing a plurality of saliency features from the image (14) with a control system (20); (ii) generating a spatial weight map for each of a plurality of image segments of the image (14) with the control system (20); (iii) adjusting the plurality of saliency features via the spatial weight map to generate a plurality of adjusted saliency features; (iv) combining at least two of the plurality of adjusted saliency features to generate a saliency map of the image (14); and (v) extracting the main subject from the saliency map of the image (14). Additionally, the plurality of saliency features can include at least two of a sharp/blur saliency feature, a spectral residual saliency feature, a color spatial distribution saliency feature, and one or more color contrast saliency features.

12 Claims, 16 Drawing Sheets

(51) Int. Cl.
  *G06K 9/00* (2006.01)
  *G06K 9/32* (2006.01)
  *G06T 7/00* (2017.01)
(52) U.S. Cl.
  CPC ......... *G06K 9/4671* (2013.01); *G06K 9/4676* (2013.01); *G06T 7/0081* (2013.01)

(56) References Cited

U.S. PATENT DOCUMENTS

| | | | |
|---|---|---|---|
| 2007/0116361 | A1 | 5/2007 | Le Meur et al. |
| 2008/0304740 | A1 | 12/2008 | Sun et al. |
| 2010/0189354 | A1 | 7/2010 | de Campos et al. |
| 2010/0191541 | A1 | 7/2010 | Prokoski |
| 2011/0229025 | A1* | 9/2011 | Zhao ................ G06K 9/4671 382/165 |
| 2014/0078320 | A1 | 3/2014 | Hong |

OTHER PUBLICATIONS

The International Search Report and Written Opinion of the International Searching Authority, May 16, 2013, Nikon Corporation, PCT/US13/30433. (related application).

Vu et al, "Main subject detection via adaptive feature refinement," Journal of Electronic Imaging, 2011.

Liu et al, "Learning to detect a salient object", IEEE Computer Vision and Pattern Recognition, 2007.

Achanta et al, "Frequency-tuned salient region detection", IEEE Computer Vision and Pattern Recognition, 2009.

Hou et al, "Saliency detection: A spectral residual approach", IEEE Computer Vision and Pattern Recognition, 2007.

Cheng et al, "Global contrast base salient regioin detection", IEEE Computer Vision and Pattern Recognition, 2011.

Goferman et al, "Context-aware saliency detection", IEEE Computer Vision and Pattern Recognition, 2010.

Itti et al, "A model of saliency-based visual attention for rapid-scene analysis", IEEE TPAMI, 1998.

Seo et al, "Nonparametric bottom-up saliency detection by self-resemblance", IEEE Computer Vision and Pattern Recognition, 2009.

Guo et al, "Spatio-temporal saliency detection using phase spectrum of quaternion Fourier transform", IEEE Computer Vision and Pattern Recognition, 2008.

Achanta et al, "Salient region detection and segmentation", ICCVS, 2008.

Wang et al, "A two-stage approach to saliency detection in images", IEEE ICASSP, 2008.

Harel et al, "Graph-based visual saliency", Advances in Neural Information Processing Systems, 2007.

\* cited by examiner

METHOD OF DETECTING A MAIN SUBJECT IN AN IMAGE

RELATED INVENTION

This application claims priority on U.S. Provisional Application Ser. No. 61/640,627, filed Apr. 30, 2012 and entitled "METHOD OF DETECTING A MAIN SUBJECT IN AN IMAGE". As far as permitted, the contents of U.S. Provisional Application Ser. No. 61/640,627 are incorporated herein by reference.

BACKGROUND

Cameras are commonly used to capture an image of a scene that includes one or more objects. It is often desirable to detect the main subject of the image from the one or more objects that are present. Main subject detection is a key element in image theme understanding research. Additionally, main subject detection can be used for many different applications. For example, main subject detection can greatly benefit in-camera capture functions (e.g., better auto-focus (AF) and auto-exposure (AE), better tracking, better image/object recognition, better composition, etc.) and out-of-camera image editing functions (e.g., adaptive image compression, image retargeting, image retrieval, etc.). Unfortunately, existing methods for main subject detection have not been completely satisfactory.

SUMMARY

The present invention provides certain unique features as a means to detect, identify and/or extract a main subject in an image. For example, the main subject detection algorithm as described in detail herein includes such features as: (i) utilizing a mix of a pixel-wise approach and a segment-wise approach as a means to detect the main subject in an image; (ii) computing a unique set of saliency features that can be utilized to detect the main subject in an image; (iii) utilizing a unique criteria for purposes of evaluating the importance of the individual saliency features as a means to detect the main subject in an image; (iv) utilizing an original method for combining the saliency features that have been identified as the most important saliency features; and (v) utilizing a unique set of refinement stages to enable the more precise and accurate detection of the main subject of an image.

In certain embodiments, the present invention is directed toward a method for detecting a main subject in an image, the image including a plurality of image segments, the method comprising the steps of: (i) computing a plurality of saliency features from the image with a control system; (ii) generating a spatial weight map for each of the plurality of image segments with the control system; (iii) adjusting the plurality of saliency features via the spatial weight map to generate a plurality of adjusted saliency features; (iv) combining at least two of the plurality of adjusted saliency features to generate a saliency map of the image; and (v) extracting the main subject from the saliency map of the image. Additionally, the plurality of saliency features can include at least two of a sharp/blur saliency feature, a spectral residual saliency feature, a color spatial distribution saliency feature, and one or more color contrast saliency features. Further, in one embodiment, the step of computing can include the plurality of saliency features including at least three of the sharp/blur saliency feature, the spectral residual saliency feature, the color spatial distribution saliency feature, and the one or more color contrast saliency features. Moreover, in one embodiment, the step of computing can include the plurality of saliency features including each of the sharp/blur saliency feature, the spectral residual saliency feature, the color spatial distribution saliency feature, and the one or more color contrast saliency features.

Additionally, in some embodiments, the step of combining includes the steps of computing a saliency metric for each of the plurality of adjusted saliency features; performing a validation check on one or more of the plurality of adjusted saliency features; and invalidating any adjusted saliency features that do not pass the validation check to provide a list of validated adjusted saliency features. In one such embodiment, the step of performing the validation check includes checking one or more additional adjusted saliency features for supporting evidence that the one or more adjusted saliency features accurately identify the main subject. Further, in another such embodiment, the step of combining can further include calculating an importance score for each of the validated adjusted saliency features; selecting at least two of the validated adjusted saliency features having the lowest importance scores; and combining the at least two of the validated adjusted saliency features to generate the saliency map of the image.

In certain embodiments, the method can further comprise the steps of analyzing the main subject that is extracted from the saliency map of the image, and determining if the extracted main subject needs to be refined. In one such embodiment, the step of analyzing includes computing the standard deviation of the one or more color contrast saliency features, and the step of determining includes comparing the standard deviation of the one or more color contrast saliency features to a predetermined threshold value to determine if the extracted main subject needs to be refined. Additionally, in one such embodiment, if it is determined that the extracted main subject needs to be refined, then the method further comprises the steps of updating the plurality of saliency features to generate a plurality of updated saliency features, and extracting the main subject from the image based on the plurality of updated saliency features. In certain embodiments, the step of updating can include the step of updating the one or more color contrast saliency features based on estimated foreground information; and/or the step of updating can include the steps of (i) updating the spatial weight map to provide an updated spatial weight map for each of the plurality of image segments with the control system, (ii) adjusting the plurality of updated saliency features via the updated spatial weight map to generate a plurality of adjusted updated saliency features, and (iii) combining at least two of the plurality of adjusted updated saliency features to generate an updated saliency map of the image.

In one embodiment, the method further comprises the step of preprocessing the image with the control system prior to computing the plurality of saliency features from the image. Further, the step of preprocessing can include one or more of (i) downsampling the image, (ii) applying a color segmentation algorithm to the downsampled image, (iii) converting the color image to a grayscale image, and (iv) converting the image from an RGB image to an LAB image.

Additionally, in one embodiment, the step of extracting includes the step of post-processing the saliency map of the image with the control system to extract the main subject from the saliency map of the image.

Further, in one embodiment, the one or more color contrast saliency features can include a lightness saliency feature, a color components saliency feature, and an LAB saliency feature.

In another application, the present invention is directed toward a main subject detection algorithm for detecting a main subject in an image, the image including a plurality of image segments, the main subject detection algorithm comprising a control system including a processor, the control system performing the steps of (A) computing a plurality of saliency features from the image, the plurality of saliency features including at least two of (i) a sharp/blur saliency feature, (ii) a spectral residual saliency feature, (iii) a color spatial distribution saliency feature, and (iv) one or more color contrast saliency features; (B) generating a spatial weight map for each of the plurality of image segments; (C) adjusting the plurality of saliency features via the spatial weight map to generate a plurality of adjusted saliency features; (D) combining at least two of the plurality of adjusted saliency features to generate a saliency map of the image; and (E) extracting the main subject from the saliency map of the image.

Further, in still another application, the present invention is directed toward a method for detecting a main subject in an image, the image including a plurality of image segments, the method comprising the steps of (A) preprocessing the image with a control system, the preprocessing including one or more of (i) downsampling the image, (ii) applying a color segmentation algorithm to the downsampled image, (iii) converting the color image to a grayscale image, and (iv) converting the image from an RGB image to an LAB image; (B) computing a plurality of saliency features from the image with the control system, the plurality of saliency features including each of (i) a sharp/blur saliency feature, (ii) a spectral residual saliency feature, (iii) a color spatial distribution saliency feature, and (iv) one or more color contrast saliency features; (C) generating a spatial weight map for each of the plurality of image segments with the control system; (D) adjusting the plurality of saliency features via the spatial weight map to generate a plurality of adjusted saliency features; (E) combining at least two of the plurality of adjusted saliency features to generate a saliency map of the image; (F) extracting the main subject from the saliency map of the image; (G) analyzing the main subject that is extracted from the saliency map of the image; and (H) determining if the extracted main subject needs to be refined, wherein if it is determined that the extracted main subject needs to be refined, then the method further comprises the steps of updating the plurality of saliency features to generate a plurality of updated saliency features, and extracting the main subject from the image based on the plurality of updated saliency features.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6B is a pictorial representation of an example of a computation of a segment-wise spatial weight map as part of the adjusting and processing of saliency features of FIG. 6A;

DESCRIPTION

Figure 1A:
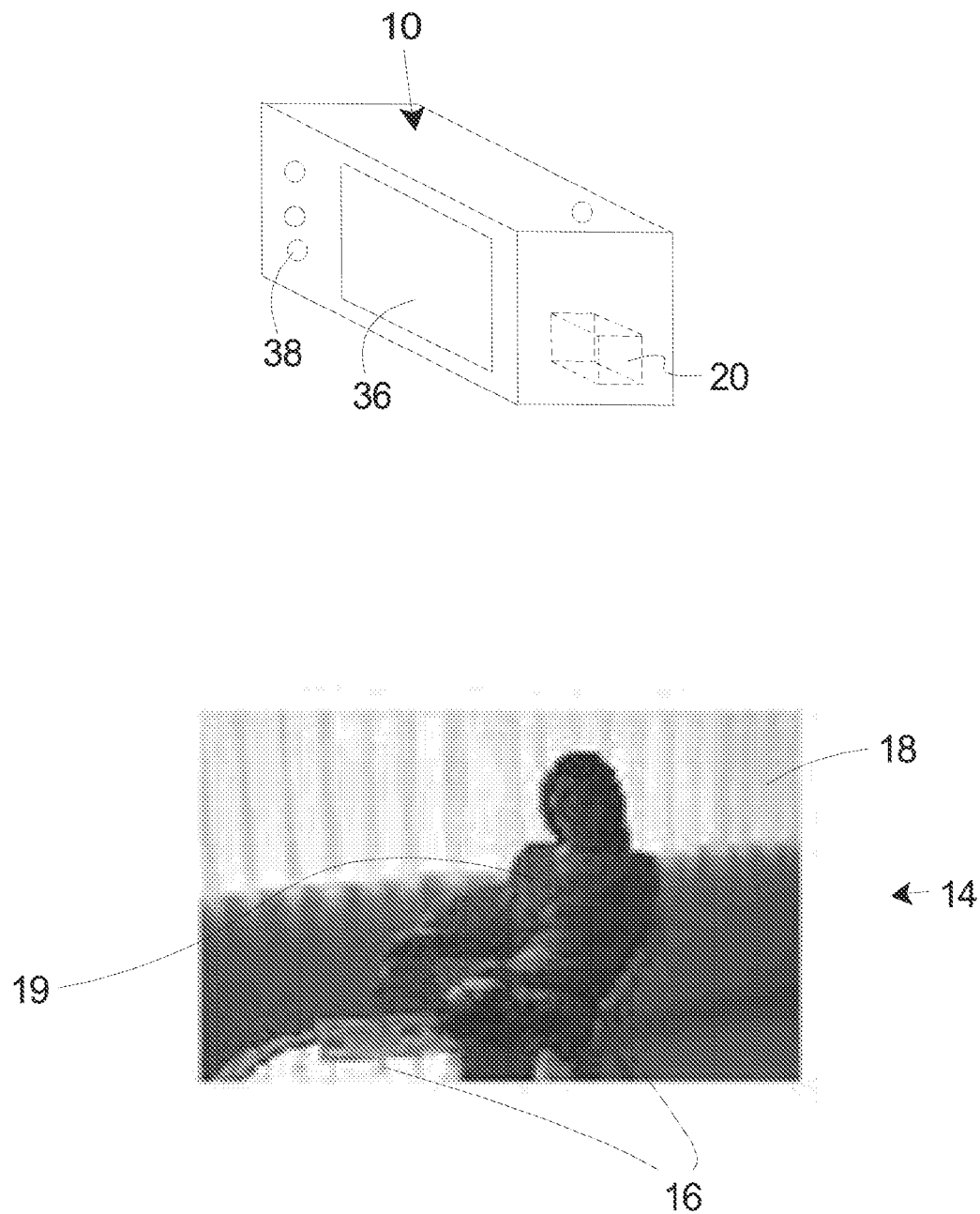
FIG. 1A is a simplified view of an image of a scene, and a simplified perspective view of an image apparatus having features of the present invention.

FIG. 1A is a simplified perspective view of an image apparatus 10 having features of the present invention. Additionally, FIG. 1A further illustrates a captured image 14 (illustrated away from the image apparatus 10) of a scene (not illustrated) that has been captured by the image apparatus 10. It should be noted that although the present invention is being demonstrated with respect to a captured image 14 that has been captured by the image apparatus 10, the teaching of the present invention is equally applicable to any image type and/or any image that has been received in any suitable manner.

The type of scene and, thus, the captured image 14 (also referred to herein as a "received image" or simply as the "image") of the scene captured by the image apparatus 10 can vary. For example, the scene and the image 14 of the scene can include one or more objects 16, e.g., persons, animals, plants, mammals, buildings, structures, furniture, etc., that are positioned within, near and/or adjacent to a background environment 18. Moreover, included within the one or more objects 16 is one or more main subject 19 which is the intended focus of the captured image 14. For example, in FIG. 1A, the image 14 of the scene is illustrated as including two objects 16 that are positioned within the background environment 18, one of the objects 16 being noted as the main subject 19 of the image 14. Alternatively, the scene and/or the image 14 of the scene can include more than two or less than two objects 16, and/or the image 14 of the scene can include more than one main subject 19.

As an overview, in certain embodiments, the image apparatus 10 includes a control system 20 (illustrated in phantom) that uses a unique method for detecting the main subject 19 of an image 14 with improved accuracy. In particular, the control system 20 utilizes a unique algorithm that detects or extracts the main subject 19 relative to the remainder of the image 14, e.g., from the background 19 of the image 14, based on information from a set of saliency features including at least one or more of a sharp/blur saliency feature, a spectral residual saliency feature, a color spatial distribution saliency feature, and/or certain color contrast saliency features (i.e. lightness, color components, and the combination of lightness and color components). As illustrated and described herein, the unique algorithm of the present invention can be referred to as a main subject detection algorithm. An embodiment of a main subject detection algorithm 200 having features of the present invention is illustrated and described herein in relation to FIG. 2, with the various steps within the main subject detection algorithm 200 being described in greater detail in relation to FIGS. 3-10.

Additionally, as described in detail herein, in certain embodiments, the main subject detection algorithm is based on these certain saliency features of the image 14, and can include the basic steps of: (i) preprocessing the image 14 as necessary; (ii) computing a set of saliency features from the image 14; (iii) adjusting and processing the saliency features via use of a spatial weight map; (iv) analyzing the importance of each of the saliency features and adaptively combining the most important (or best) of the saliency features to generate a saliency map (this step is also referred to herein as a stage 1 analysis, which assumes that the background region is related to the image borders); (v) post-processing the saliency map to extract the main subject, where the main subject region is detected via applying segmentation techniques on the saliency map (previous algorithms have employed a block-wise approach while the proposed invention is a mix of a pixel-wise and a segment-wise approach); (vi) analyzing the extracted/detected main subject region of the image to decide if refinement or updating is required (this step essentially evaluates the effectiveness of the stage 1 analysis to determine if it is necessary and/or appropriate to proceed to a stage 2 analysis; and generally one would only proceed to the stage 2 analysis if the estimated main subject region from the stage 1 analysis contains considerable color variations); (vii) if necessary, updating the saliency features and extracting the main subject region from a identified portion of the original image 14 (this step is also referred to as the stage 2 analysis, which focuses on the foreground region that is related to the estimated main subject as determined by the stage 1 analysis); and (viii) outputting the identified main subject region and other relevant information (the output information can include one or more of a single point in the main subject region, a rough region of the main subject, and a probability density map of the main subject). Additionally and/or alternatively, one or more of the identified steps can be combined or eliminated, and additional steps can be added without altering the intended scope and breadth of the present invention.

In summary, as provided herein, in various embodiments, the main subject detection algorithm 200 of the present invention utilizes multiple stages to refine main subject detection based on background/foreground information, with (i) the stage 1 analysis assuming that the background region is related to image borders, and focusing on such factors as region compactness, region spatial location, and similarity/support from other features; and (ii) the stage 2 analysis focusing on the foreground region that is related to the estimated main subject as determined by the stage 1 analysis.

By utilizing the main subject detection algorithm 200 as described in detail herein, the main subject can be quickly and effectively identified within a wide variety of images. For example, the main subject detection algorithm 200 can be used with images where the main subject has similar color or colors as the background, where the main subject contains multiple colors, where the main subject includes blur, where the main subject is large scale, where the main subject is small or very small scale, where the main subject is off-center in the image, where the image has a complex background, where the main subject is in backlight, where the image is of a night scene, and other appropriate image types.

Figure 1B:
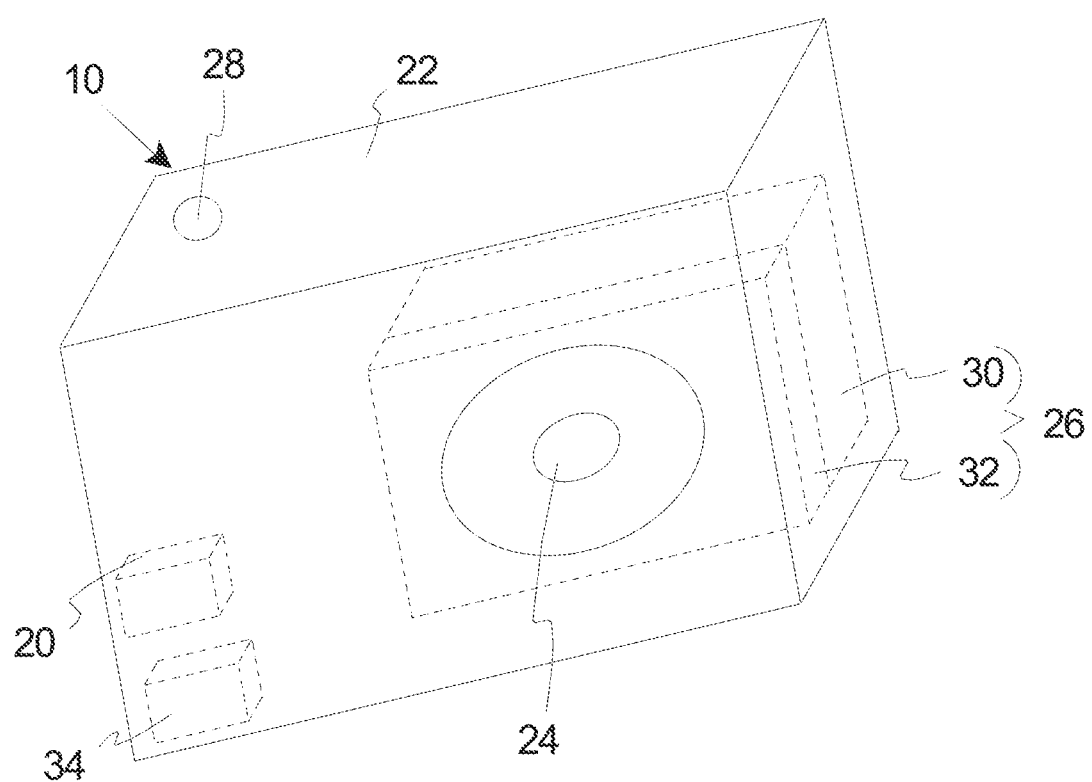
FIG. 1B is a simplified front perspective view of the image apparatus of FIG. 1A.

FIG. 1B illustrates a simplified front perspective view of the image apparatus 10 illustrated in FIG. 1A. In this embodiment, the image apparatus 10 is a digital camera, and includes an apparatus frame 22, an optical assembly 24, and a capturing system 26 (illustrated as a box in phantom), in addition to the control system 20 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of a scene.

The apparatus frame 22 can be rigid and support at least some of the other components of the image apparatus 10. In one embodiment, the apparatus frame 22 includes a generally rectangular shaped hollow body that forms a cavity that receives and retains at least some of the other components of the image apparatus 10. Further, the apparatus frame 22 can include a shutter button 28 that causes the capturing system 26 to capture the image 14 (illustrated in FIG. 1A).

The optical assembly 24 can include a single lens or a combination of lenses that work in conjunction with each other to focus light onto the capturing system 26. In one embodiment, the image apparatus 10 includes an autofocus assembly (not shown) including one or more lens movers that move one or more lenses of the optical assembly 24 in or out until the sharpest possible image of the main subject, e.g., the main subject 19 of the image 14 illustrated in FIG. 1A, is received by the capturing system 26.

The capturing system 26 captures information for the image 14. The design of the capturing system 26 can vary according to the type of image apparatus 10. For a digital-type camera, the capturing system 26 includes an image sensor 30 (illustrated in phantom) e.g., a charge coupled device, a filter assembly 32 (illustrated in phantom) e.g., a Bayer filter, and a storage system 34 (illustrated in phantom). The storage system 34 can be fixedly or removably coupled to the apparatus frame 22. Non-exclusive examples of suitable storage systems 34 include flash memory, a floppy disk, a hard disk, or a writeable CD or DVD.

The control system 20 is electrically connected to and controls the operation of the electrical components of the image apparatus 10. The control system 20 can include one or more processors and circuits, and the control system 20 can be programmed to perform one or more of the functions described herein. In FIG. 1B, the control system 20 is secured to the apparatus frame 22 and the rest of the components of the image apparatus 10. Further, in this embodiment, the control system 20 is positioned within the apparatus frame 22 for in camera processing of the image 14. Alternatively, the control system 20 that utilizes the algorithm disclosed herein can be separate from the camera, e.g., the control system 20 can be at least a portion of a computer, a website or other device that receives the image 14 and performs post-processing on the image 14. As utilized herein, the capturing system 26, the storage system 34, and/or the computer, website or other device that receives the image 14 can be referred to generally as a receiving device.

Moreover, in certain embodiments, the control system 20 can include software and/or firmware that can effectively utilize and/or apply the main subject detection algorithm 200 of the present invention to quickly and accurately detect the main subject 19 within a given image 14.

Referring back to FIG. 1A, in some embodiments, the image apparatus 10 can further include an image display 36 that displays the image 14. With this design, the user can decide whether the image 14 should be stored or whether the image 14 should be deleted. Further, the image display 36 can display other information that can be used to control the various functions of the image apparatus 10.

Additionally, the image apparatus 10 can include one or more control switches 38 that are electrically connected to the control system 20, which allow the user to control the functions of the image apparatus 10. For example, one or more of the control switches 38 can be used to selectively switch the image apparatus 10 to the main subject detection processes disclosed herein. In certain embodiments, in order to save computation, the present invention can be selectively applied (manually or automatically) to only certain types of images.

As described in detail herein, the use and application of the main subject detection algorithm 200 of the present invention can be analyzed by utilizing flow charts that describe in general and more specifically the various steps that may be included within the main subject detection algorithm 200. However, although it is disclosed that the steps employed in the various flow charts are performed in a certain order, it should be noted that the steps can be performed in a different order, and/or one or more of the steps can be combined or eliminated without altering the overall intended scope and breadth of the present invention.

Figure 2:
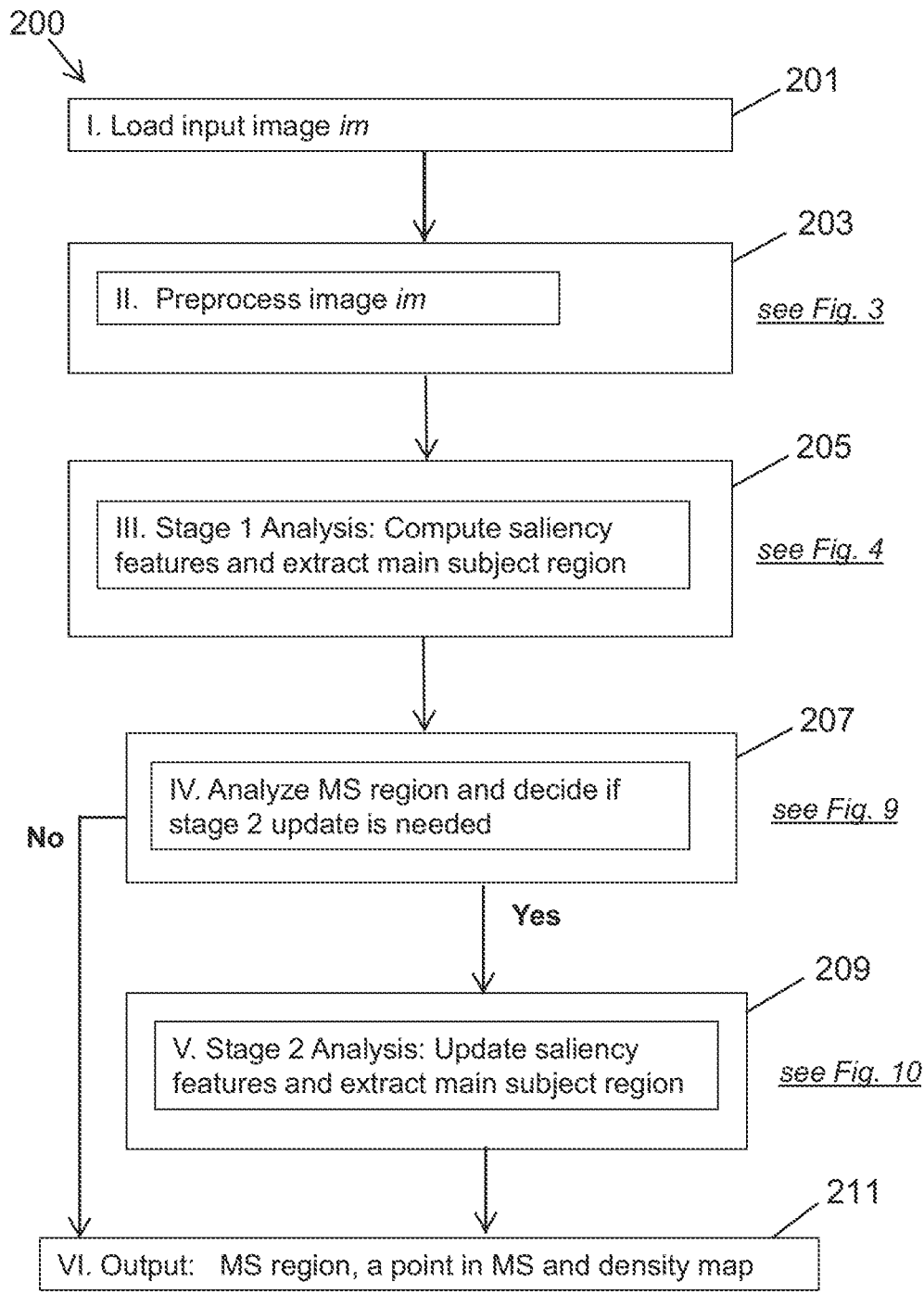
FIG. 2 is a flow chart that illustrates an overall outline of an embodiment of a main subject detection algorithm having features of the present invention.

FIG. 2 is a flow chart that illustrates an overall outline of an embodiment of the main subject detection algorithm 200 having features of the present invention. Initially, in step 201, an image is loaded into or otherwise captured by an image apparatus, such as a digital camera, or an image is otherwise made available to the main subject detection algorithm 200. Next, in step 203, the image is preprocessed as necessary in order to provide an image that can be effectively evaluated, while enabling certain savings to be realized in cost and time. Specific steps that may be included as part of the preprocessing of the image are described herein below in relation to FIG. 3.

In step 205, a stage I analysis of the image is undertaken. As described herein, the stage I analysis includes a computation of certain saliency features of the image and the subsequent extraction of the main subject region from within the image. Specific steps that may be included as part of the stage 1 analysis are described herein below in relation to FIG. 4. Moreover, each of such steps is further described herein below in relation to FIGS. 5A-8A.

In step 207, the extracted main subject region is analyzed, and a determination is made as to whether the accuracy of the main subject region extraction is sufficient or whether the detection of the main subject region needs to be refined and/or updated. This analysis and determination is described in further detail herein below in relation to FIG. 9.

If it is determined that the extracted main subject region does need to be refined and/or updated, in step 209, a stage 2 analysis of the image is undertaken. In this step, the computed saliency features of the image are updated and the main subject region is again subsequently extracted from within the image. Specific steps that may be included as part of the stage 2 analysis are described herein below in relation to FIG. 10, with the individual steps being somewhat similar to the steps provided in the stage 1 analysis.

Subsequently, in step 211, the extracted main subject region is outputted along with other relevant information. In particular, the outputted information can be a direct result of the stage 1 analysis of the image (i.e. step 205), if the stage 1 analysis has been analyzed and determined to be sufficient and/or appropriate (in accordance with step 207); or the outputted information can be a direct result of the updated/refined stage 2 analysis of the image (i.e. step 209). As noted above, the outputted information can include one or more of a single point in the main subject region, a rough region of the main subject, and a probability density map of the main subject.

Figure 3:
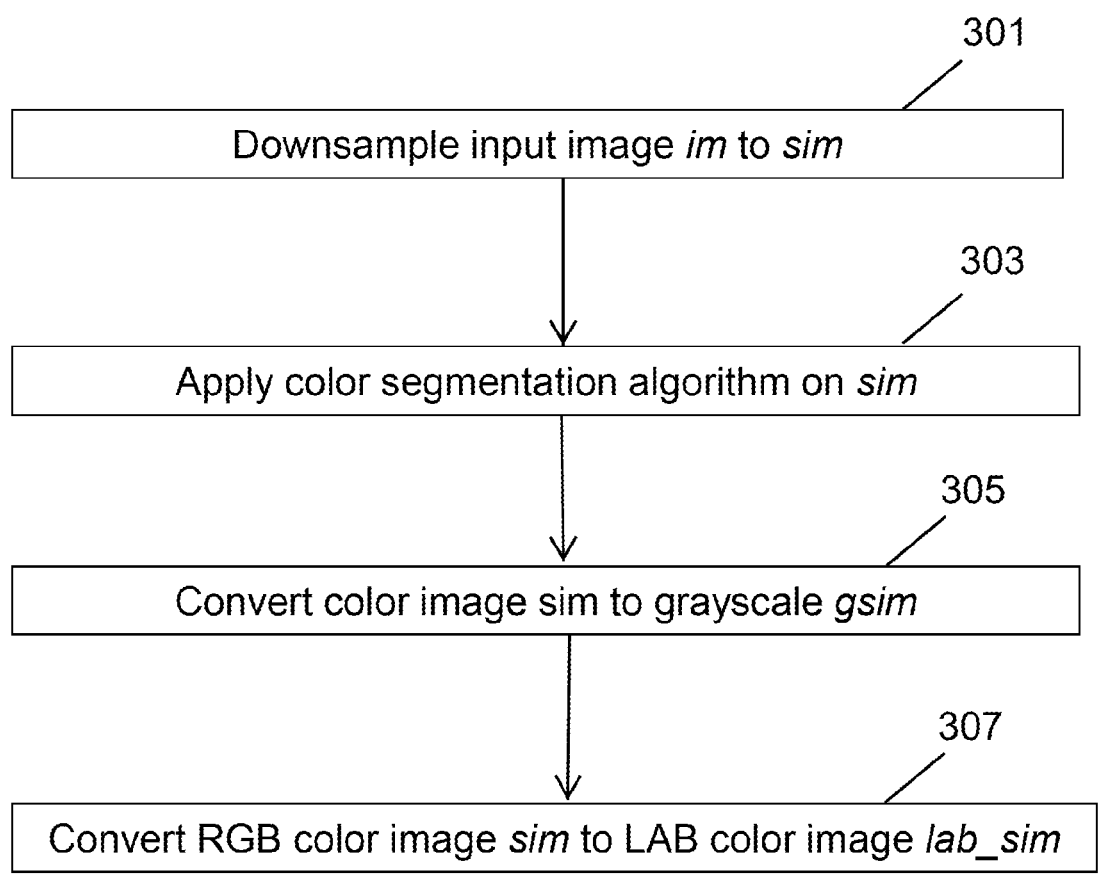
FIG. 3 is a flow chart that illustrates steps involved in preprocessing an input image in accordance with the main subject detection algorithm of FIG. 2.

FIG. 3 is a flow chart that illustrates various steps that may be involved in preprocessing an input image in accordance with the main subject detection algorithm 200 of FIG. 2. In particular, FIG. 3 is a flow chart illustrating certain steps that may be undertaken as part of the preprocessing of the image noted above in step 203. In particular, the preprocessing of the image can include, in step 301, downsampling of the input image (im) both horizontally and vertically to generate a downsampled image (sim) as a means to save on computational costs that may otherwise be incurred from analyzing the complete image. In one embodiment, the input image may be downsampled by a factor of one-half. Alternatively, the input image may be downsampled by a factor of one-third or another appropriate downsizing factor.

Additionally, the preprocessing of the input image (im) and/or the downsampled image (sim) can further include one or more of the following steps, which can be performed in any suitable or appropriate order. For example, as shown in FIG. 3, in step 303, a mean shift or other suitable color segmentation algorithm may be applied to the downsampled image (sim) to generate color segments within the image. Additionally, in step 305, if the image is a color image, then the downsampled image (sim) can be converted into a grayscale image (gsim) for further processing. Further, in step 307, if the image is a color image that is in the general RGB format, the downsampled image (sim) can be converted into the LAB format. More specifically, the LAB format comprises a lightness factor (L) as well as including color components A and B.

Figure 4:
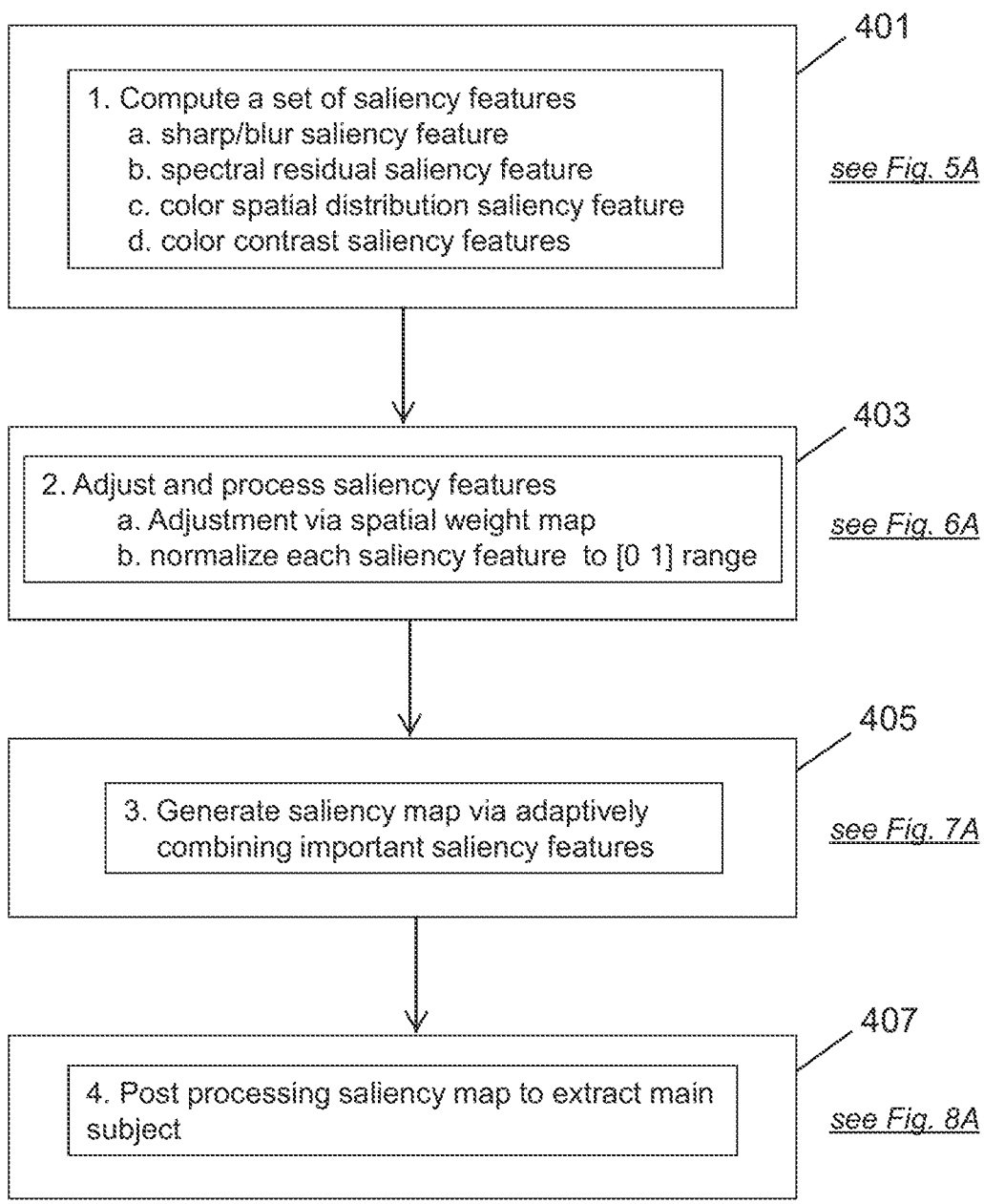
FIG. 4 is a flow chart that illustrates a stage 1 analysis for computing saliency features and extracting the main subject region in accordance with the main subject detection algorithm of FIG. 2.

FIG. 4 is a flow chart that illustrates steps that may be included in the stage 1 analysis for computing saliency features and extracting the main subject region in accordance with the main subject detection algorithm 200 of FIG. 2. As part of the stage 1 analysis, it can be generally assumed that the background region of the image is related to the borders of the image, as the main subject will typically be included toward the center of the image.

Initially, in step 401, a set of saliency features is computed from the image. As provided herein, the set of saliency features computed from the image can include one or more of a sharp/blur saliency feature, a spectral residual saliency feature, a color spatial distribution saliency feature, and color contrast saliency features. Additional aspects of the computation of such saliency features of the image are provided herein below in relation to FIGS. 5A-5E.

In step 403, the computed saliency features are adjusted and processed. In particular, the computed saliency features may be adjusted via utilization of a spatial weight map, and then each saliency feature may be normalized to the [0 1] range so that the saliency features may be effectively compared to one another to determine which saliency features are the more important for purposes of accurately extracting the main subject region. Specific details, features and aspects of this step are provided herein below in relation to FIGS. 6A and 6B.

In step 405, a saliency map is generated by adaptively combining what are determined to be the more important of the saliency features. As detailed herein, the more important saliency features are determined by analyzing characteristics of individual saliency features. This step is further detailed and analyzed herein below in relation to FIGS. 7A and 7B.

In step 407, the saliency map generated in step 405 undergoes certain post-processing steps in order to extract the main subject region of the image. Further details and aspects of this step are provided herein below in relation to FIGS. 8A and 8B.

Figure 5A:
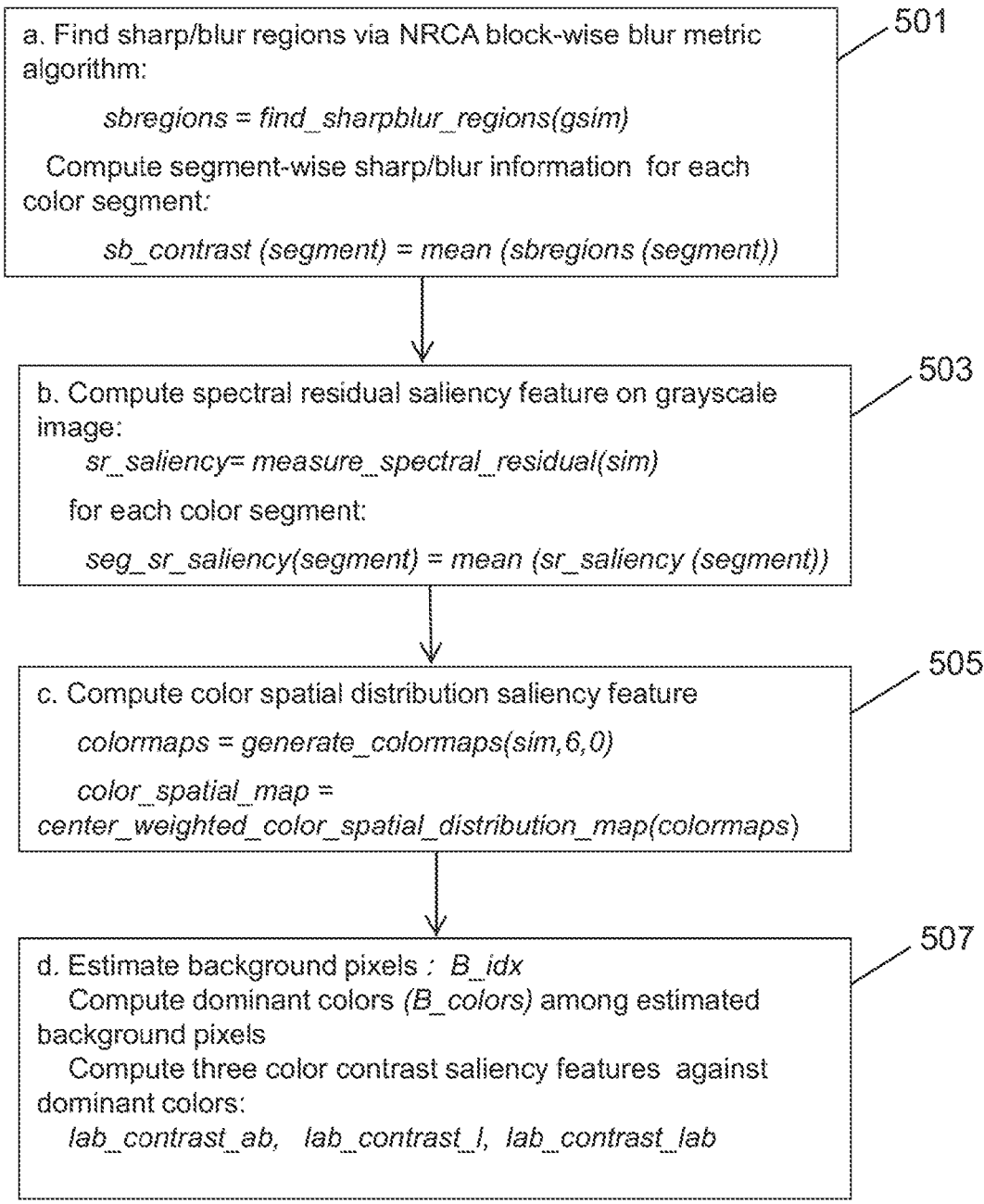
FIG. 5A is a flow chart that illustrates a computation of a set of saliency features as part of the stage 1 analysis of FIG. 4.

FIG. 5A is a flow chart that illustrates a computation of a set of saliency features as part of the stage 1 analysis of FIG. 4. As noted above, the set of saliency features computed from the image can include one or more of a sharp/blur saliency feature, a spectral residual saliency feature, a color spatial distribution saliency feature, and color contrast saliency features.

As shown in FIG. 5A, in step 501, the sharp/blur saliency feature is computed (i.e. the sharp/blur regions are identified and evaluated within the image) and a feature map is generated related to this saliency feature. Additionally, the sharp/blur saliency feature can be computed for each color segment within the image. As computed, the sharp/blur saliency feature is designed to coarsely reflect the segment-wise sharp/blur information that is present within the image. In some embodiments, the sharp/blur saliency feature can be computed in a block-wise manner by utilizing a blur metric algorithm. For example, in one embodiment, the blur metric algorithm can be a learning-based image sharpness classification algorithm. The classifier is trained based on a novel set of features related to characteristics extracted from texture regions in high pass/band pass filtered images. The classifier is then used to determine an image or image region (i.e. an image block) as either sharp or blur. Such an algorithm is disclosed in PCT Application Serial Number PCT/US11/48218, entitled "Image Sharpness Classification System" as filed by Li Hong, who is also the inventor of the present invention. As far as is permitted, the contents of PCT Application Serial Number PCT/US11/48218 are incorporated herein by reference. Alternatively, another suitable blur metric algorithm may be utilized.

Additionally, the results computed herein can be combined with separate color segmentation results to generate and/or identify the sharp/blur segments within the image. As such, a mean sharp/blur score can be computed at each individual color segment within the image. Moreover, each color segment can be identified as sharp or blur by comparing the mean sharp/blur score to a predetermined threshold value. For example, in one embodiment, each color segment can be identified as sharp if its mean sharp/blur score is greater than or equal to a threshold value of 0.5. Alternatively, other threshold values can be applied for labeling each color segment as either sharp or blur.

It should be noted that, in certain embodiments, the sharp/blur analysis may only be viewed as valid when a sufficient number of sharp/blur regions are present within the image.

Additionally, in certain embodiments, the computation of the sharp/blur saliency feature may be varied to more accurately compute such saliency feature. For example, the sharp/blur saliency feature is generally utilized to highlight the sharp regions in the image. However, sharp regions may sometimes be found within both the background regions and the foreground regions of the image. Thus, in some embodiments, the sharp/blur saliency feature may be invalidated as one of the important saliency features for the blending process if (i) the sharp/blur feature does not have a good enough saliency metric value (even if such feature would otherwise rate as one of the more important saliency features based on score alone), or (ii) the sharp/blur feature has a good saliency metric value, but other saliency features exist that have a relatively good saliency metric.

Figure 5B:
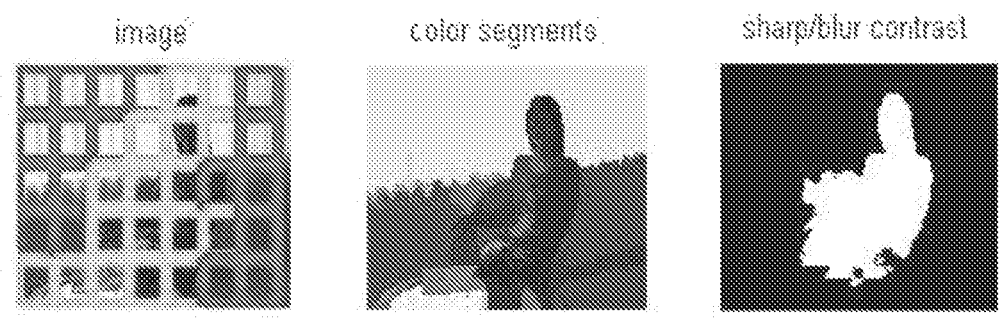
FIG. 5B is a pictorial representation of an example of a computation of a sharp/blur saliency feature as part of the computation of a set of saliency features of FIG. 5A.

FIG. 5B is a pictorial representation of an example of a computation of a sharp/blur saliency feature as part of the computation of a set of saliency features of FIG. 5A. As illustrated in the left-most image in FIG. 5B, and as noted above, the sharp/blur saliency feature can be computed in a block-wise manner, i.e. by dividing the image into a plurality of similar-sized blocks. The results of this block-wise approach can be combined with separate color segmentation results (as shown in the center image in FIG. 5B) to generate and/or identify the sharp/blur segments, i.e. the sharp/blur contrast within the image (as shown in the right-most image in FIG. 5B).

Referring back to FIG. 5A, in step 503, the spectral residual saliency feature is computed on the grayscale image and a feature map is then generated related to this saliency feature. This can be accomplished by first computing the spectral residual of an image in the spectral domain, and then constructing the corresponding saliency map in the spatial domain. Additionally, the spectral residual saliency feature can be computed on the grayscale image for each color segment. Utilization of this saliency feature attempts to explore the properties of the background of the image rather than focusing on the properties of the targeted objects, e.g., the main subjects, in the image. The use of the spectral residual saliency feature is predicated upon natural image statistics, which provide that redundancies correspond to statistically invariant properties of our natural environment (e.g., the background), while the "innovation" part of the image corresponds to the visual saliency of the main subject of the image. For example, certain features of the main subject, e.g., texture, frequency, etc., are typically different than those for the background region. Moreover, this step endeavors to smooth out the various regions of the image, which may be accomplished by use of, for example, a filter.

Figure 5C:
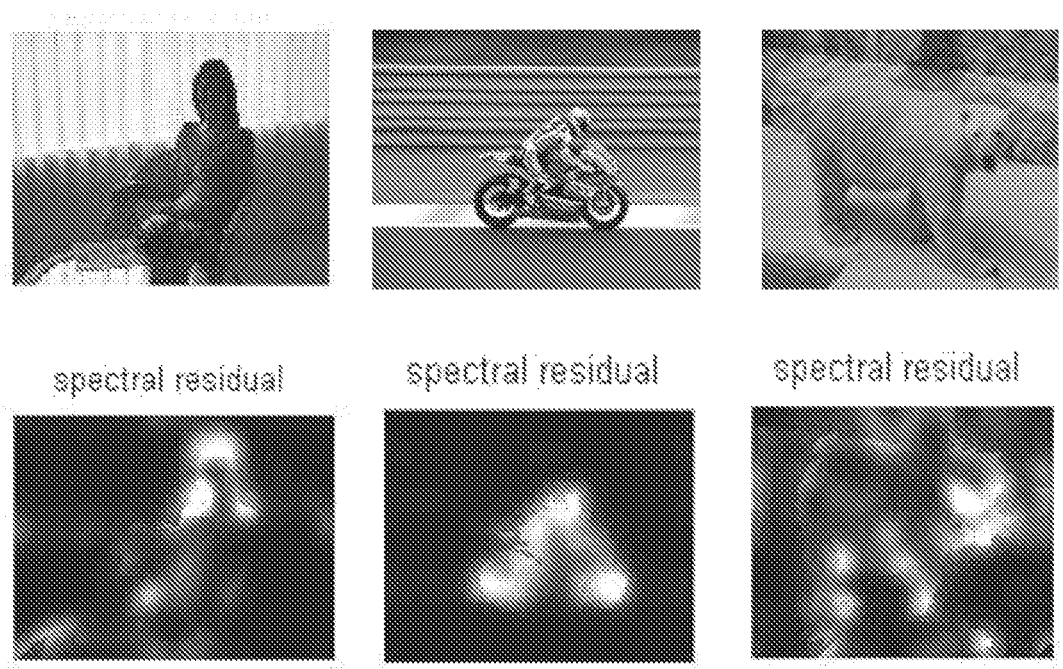
FIG. 5C is a pictorial representation of examples of a computation of spectral residual saliency features as part of the computation of a set of saliency features of FIG. 5A.

FIG. 5C is a pictorial representation of examples of a computation of spectral residual saliency features as part of the computation of a set of saliency features of FIG. 5A. In particular, FIG. 5C illustrates three individual images (across the top of FIG. 5C) and specific examples of the spectral residual saliency feature that has been generated from each of the three individual images (across the bottom of FIG. 5C) based on the methodology described herein.

Again referring back to FIG. 5A, in step 505, the color spatial distribution saliency feature is computed and a feature map is generated related to this saliency feature. The usage of the color spatial distribution saliency feature is based on the general observation that the wider a color is spatially distributed in the image, the less likely it is that a salient object in the image contains this color. Conversely, evidence of a narrow or compact color distribution within the image is typically more likely indicative of the main subject of the image.

In certain embodiments, the computation of the color spatial distribution saliency feature can include the following steps: (1) Represent colors in the image using GMMs (Gaussian mixture models); (2) Compute the probability of each pixel color related to each color component; (3) Compute the horizontal/vertical spatial variance of each color component; (4) Define the color spatial variance as the sum of horizontal and vertical spatial variance and normalize it to [0 1] range; (5) Define the color spatial-distribution as a weighted sum of each color component, spatial variance and pixel color probability related to that color component; and (6) Adjust the spatial distribution by considering center-weight.

The GMMs can be defined utilizing the function:

$$\{\omega_c, \mu_c, \Sigma_c\}_{c=1}^{C} \quad \text{(Equation 1)}$$

where $\{\omega_c, \mu_c, \Sigma_c\}$ is the weight, mean color and the covariance matrix of the $c^{th}$ component.

The probability of each pixel color to each color component can be computed utilizing the equation:

$$p(c \mid I_x) = \frac{\omega_c N\left(I_x \mid \mu_c, \sum_c\right)}{\sum_c \omega_c N\left(I_x \mid \mu_c, \sum_c\right)} \quad \text{(Equation 2)}$$

The horizontal variance for each color component c can be computed utilizing the equations:

$$V_h(c) = \frac{1}{|X|_c} \sum_x p(c \mid I_x) |x_h - M_h(c)|^2 \quad \text{(Equation 3)}$$

$$M_h(c) = \frac{1}{|X|_c} \sum_x p(c \mid I_x) \cdot x_h \quad \text{(Equation 4)}$$

where $x_h$ is the x-coordinate of the pixel x, and $$|X|_c = \sum_x p(c \mid I_x)$$

The vertical variance of each color component c can be computed utilizing similar equations for $V_v(c)$.

The spatial variance of color component c can be computed utilizing the equation:

$$V(c) = V_h(c) + V_v(c) \quad \text{(Equation 5)}$$

The color spatial distribution can be defined utilizing the function:

$$f_s(x, I) \propto \sum_c p(c \mid I_x) \cdot (1 - V(c)) \quad \text{(Equation 6)}$$

The center-weighted spatial distribution can be defined utilizing the function:

$$f_s(x, I) \propto \sum_c p(c \mid I_x) \cdot (1 - V(c)) \cdot (1 - D(c)) \quad \text{(Equation 7)}$$

where $D(c) = \sum_x p(c \mid I_x) d_x$, and $d_x$ is the distance from pixel x to the image center.

Figure 5D:
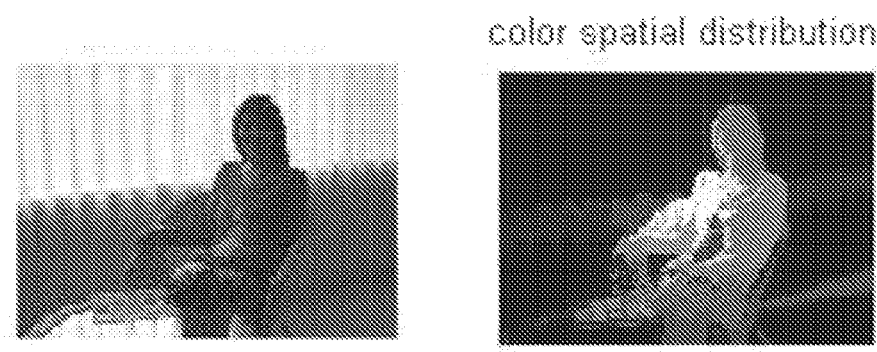
FIG. 5D is a pictorial representation of an example of a computation of a color spatial distribution saliency feature as part of the computation of a set of saliency features of FIG. 5A.

FIG. 5D is a pictorial representation of an example of a computation of a color spatial distribution saliency feature as part of the computation of a set of saliency features of FIG. 5A. In particular, FIG. 5D illustrates the initial image (on the left side) and then the color spatial distribution that has been computed for the image (on the right side) based on the methodology as described herein.

Again referring back to FIG. 5A, in step 507, the color contrast saliency features are computed for the image and a feature map is generated related to each of these saliency features. In particular, a separate computation and feature map are provided related to the color contrast saliency feature for each of the lightness (L), i.e. a lightness saliency feature, the color components (A+B), i.e. a color components saliency feature, and for the combination (LAB), i.e. an LAB saliency feature. Additionally, as utilized herein, each of the color contrast saliency features, i.e. the lightness saliency feature, the color components saliency feature, and the LAB saliency feature, can be alternatively referred to as a first color contrast saliency feature, a second color contrast saliency feature, and/or a third color contrast saliency feature.

Initially, in a stage 1 analysis, the background pixels are estimated from within the image. As noted above, for the stage 1 analysis, it can be generally assumed that the background region of the image is related to the borders of the image, as the main subject will typically be included toward the center of the image. Subsequently, the dominant background colors are computed from amongst the estimated background pixels. Then, in the stage 1 analysis, the color contrast features are measured against the dominant background colors. This computation utilizes the dominant background colors instead of the mean color of the background because many image backgrounds contain more than one dominant color, and, thus, the mean color of the background may not accurately reflect the true background color characteristics. In one non-exclusive example, if a background contains two dominant colors, the color contrast can be computed against each of the two dominant background colors, and the feature map is then generated by selecting the lowest contrast among the two contrasts.

Additionally, it should be noted that when a step similar to step 507 is applied during a stage 2 analysis (see e.g., FIG. 10), the color contrast features are measured against the dominant color(s) of the foreground as provided or estimated from the stage 1 analysis.

Figure 5E:
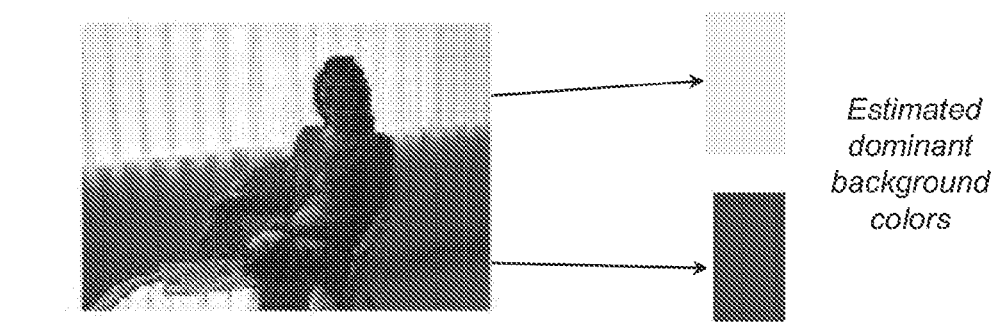
FIG. 5E is a pictorial representation of an example of a computation of color contrast saliency features as part of the computation of a set of saliency features of FIG. 5A.
Figure 5E:
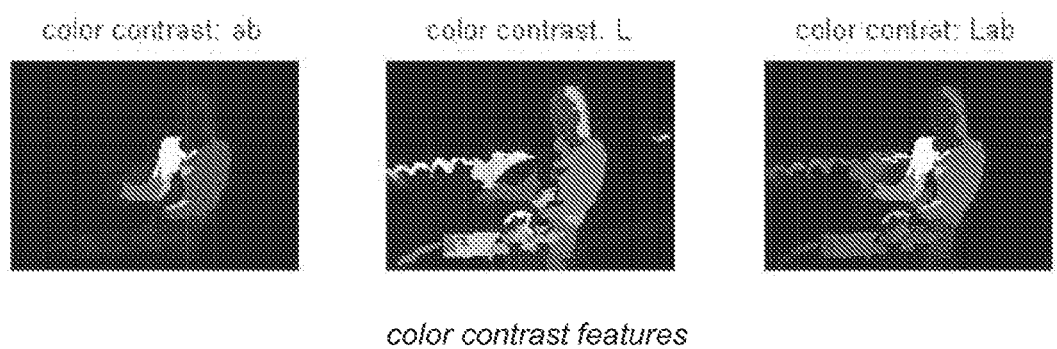

FIG. 5E is a pictorial representation of an example of a computation of color contrast saliency features as part of the computation of a set of saliency features of FIG. 5A. In particular, FIG. 5E illustrates across the top of the Figure from left-to-right, the image, and the estimated dominant background colors that are computed from amongst the estimated background pixels from near the borders of the image. Additionally, across the bottom of the Figure from left-to-right, FIG. 5E illustrates the color contrast saliency features (i.e. color contrast AB; color contrast L; and color contrast LAB) that are measured against the estimated dominant background colors.

Figure 6A:
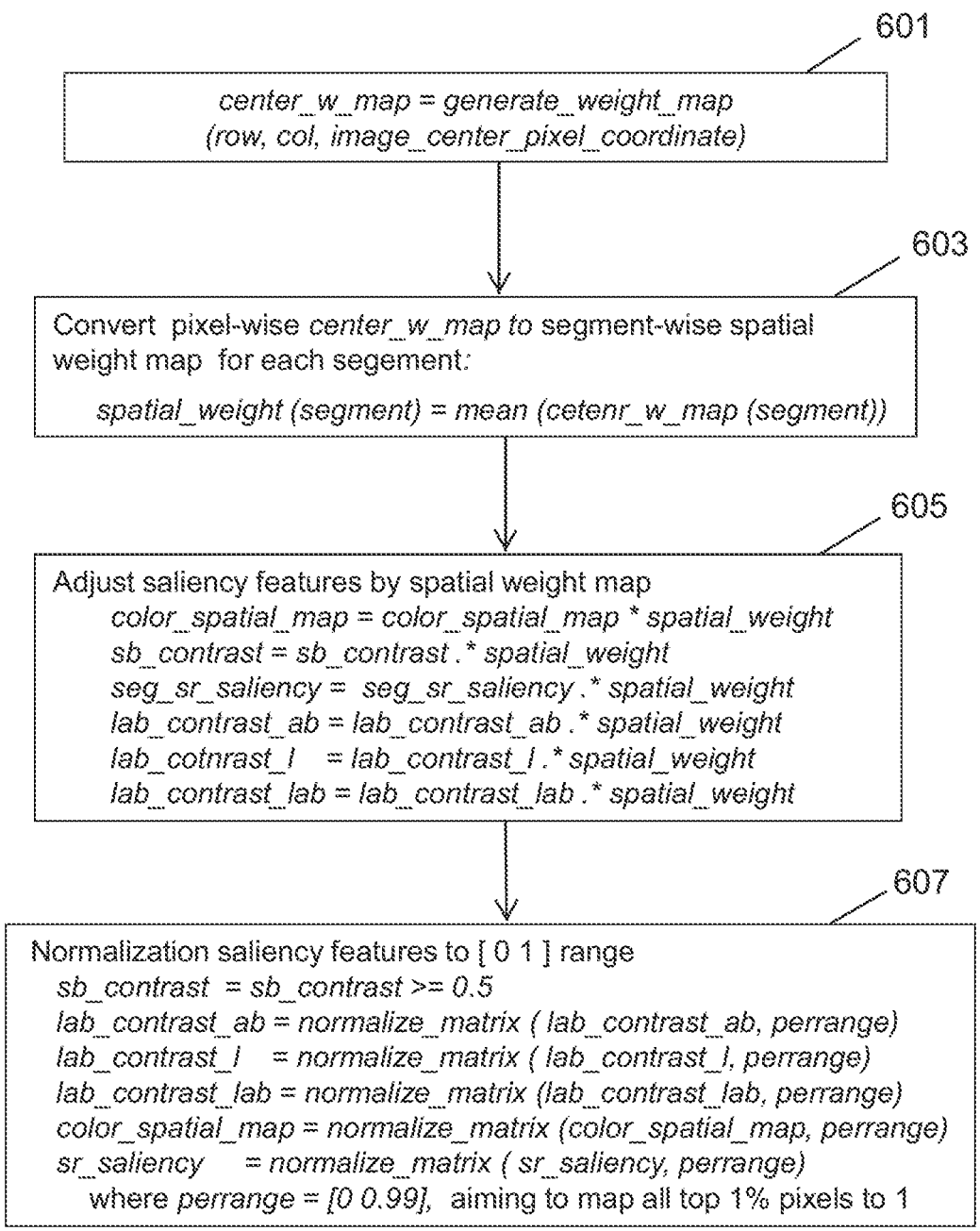
FIG. 6A is a flow chart that illustrates adjusting and processing of saliency features as part of the stage 1 analysis of FIG. 4.

FIG. 6A is a flow chart that illustrates the adjusting and processing of the computed saliency features as part of the stage 1 analysis of FIG. 4. Initially, in step 601, a pixel-wise center-weight map is computed for the image. It should be noted that the image resolution for this step will be the same for all same size images. The pixel-wise center-weight map can be computed through application of the equation:

$$f(r,c)=1-\sqrt{2\times(r-r_0)^2/\text{rows}^2+2\times(c-c_0)^2/\text{cols}^2} \quad \text{(Equation 8)}$$

where $(r_0,c_0)$ is the center of the image (i.e. the row and the column of the center-most pixel), and [rows,cols]=size of the image (i.e. the number of rows and columns of pixels within the image).

In step 603, the pixel-wise center-weight map is converted into a segment-wise spatial weight map. This conversion can be accomplished by combining the pixel-wise center-weight map with the color segmentation results as generated above, and then computing the mean spatial weight of each color segment. As illustrated, FIG. 6B is a pictorial representation of an example of a computation of a segment-wise spatial weight map as part of the adjusting and processing of saliency features of FIG. 6A. In particular, FIG. 6B illustrates, from left-to-right, the pixel-wise center-weight map that is generated in step 601; the color segmentation results from the image that are combined with the pixel-wise center-weight map; and the resulting segment-wise spatial weight map from such combination.

In step 605, the computed saliency features are adjusted by applying the spatial weight map. In particular, the spatial weight map generated above in step 603 is applied to adjust each of the sharp/blur saliency feature, the spectral residual saliency feature, the color spatial distribution saliency feature, and the color contrast saliency features (i.e. color contrast AB; color contrast L; and color contrast LAB).

Then, in step 607, the saliency features are normalized to the [0 1] range so that the saliency features can be effectively compared to one another. As provided above, the sharp/blur saliency feature is already evaluated based on a predetermined threshold value, e.g., each color segment can be identified as sharp if its mean sharp/blur score is greater than or equal to a threshold value 0.5. Additionally, during the process of normalizing the other saliency features, in some embodiments, the normalization is undertaken with a goal to map all of the top one percent of the pixels in each category to one. Thus, the other ninety-nine percent of the pixels will be set (normalized) to a value between zero and one.

Figure 7A:
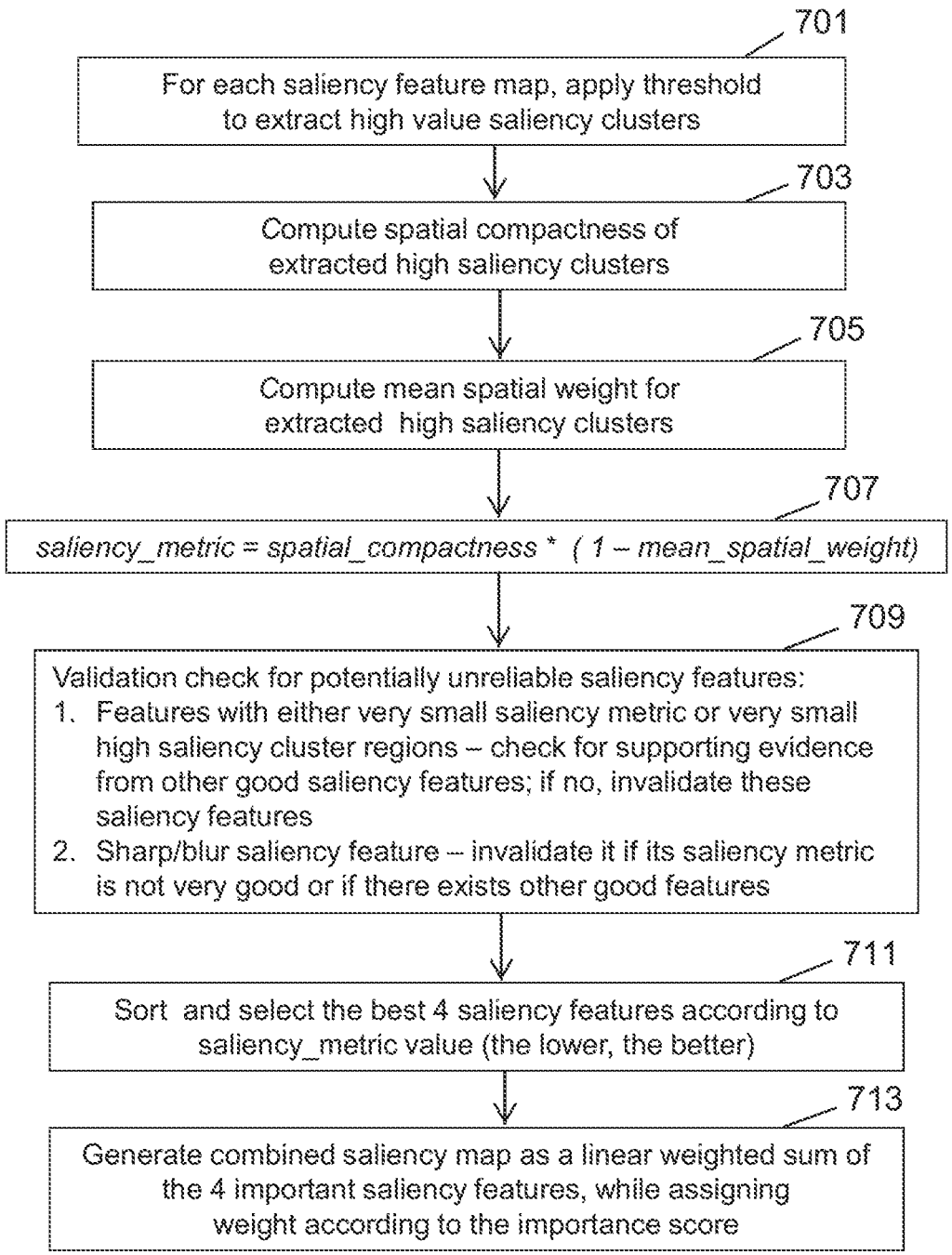
FIG. 7A is a flow chart that illustrates measurement of the importance of saliency features and adaptively combining important saliency features as part of the stage 1 analysis of FIG. 4.

FIG. 7A is a flow chart that illustrates measurement of the importance of the computed saliency features and adaptively combining important saliency features as part of the stage 1 analysis of FIG. 4. As provided herein, the importance of the saliency features is evaluated based on the spatial compactness and the spatial location of certain high saliency clusters. Moreover, in measuring the importance of the various saliency features as computed above, each saliency feature map is analyzed and/or evaluated. For example, in embodiments that include the saliency features described above, the importance of the saliency features is determined by analyzing and/or evaluating each of the six saliency feature maps generated above. More particularly, one map is analyzed and/or evaluated for the sharp/blur saliency feature, one map is analyzed and/or evaluated for the spectral residual saliency feature, one map is analyzed and/or evaluated for the color spatial distribution saliency feature, and three maps are analyzed and/or evaluated for the color contrast saliency features (i.e. one map is analyzed and/or evaluated for the lightness saliency feature (L), one map is analyzed and/or evaluated for the color components saliency feature (A+B), and one map is analyzed and/or evaluated for the combined color contrast saliency feature (LAB)).

In step 701, for each saliency feature map, a threshold is applied in order to extract the high value saliency clusters. In particular, recalling that the saliency feature values have been normalized to the [0 1] range, in one embodiment, the high saliency clusters can be extracted by utilizing a threshold value of 0.5. Thus, a high saliency cluster would exist if the saliency score was greater than or equal to 0.5. Alternatively, threshold values greater than or less than 0.5 can also be used.

Then, in step 703, the spatial compactness is computed for each of the extracted high saliency clusters. The spatial compactness can be computed by utilizing the equation:

$$\text{Compactness}(P) = \frac{\sum_{(y,c)\in P} \sqrt{(r-r_0)^2 + (c-c_0)^2}}{|P|^{0.625}} \quad \text{(Equation 9)}$$

where (r,c) is the pixel belonging to P, $(r_0,c_0)$ is the centroid of P (spatial coordinates), and |P| is the number of pixels in P.

In step 705, the mean spatial weight is computed for each of the extracted high saliency clusters. In particular, this step can be completed by applying a pixel-wise spatial map to each of the extracted high saliency clusters that gives greater weight to the pixels located in and around the center of the image. It should be noted that greater weight is given to the pixels located in and around the center of the image because, as noted above, the main subject of an image is typically positioned toward the center of the image.

In step 707, a saliency metric is computed for each of the saliency feature maps. The saliency metric can be computed for each of the saliency feature maps by applying the equation:

saliency_metric=spatial_compactness*(1−mean_spatial_weight) (Equation 10)

In step 709, a validation check is applied for rooting out and eliminating potentially unreliable saliency features from the analysis. In particular, this validation check can be conducted in different manners when addressing: (1) features with either very small saliency metric or very small (i.e. compact) high saliency cluster regions; and (2) the sharp/blur saliency feature. Additionally and/or alternatively, such validation check can evaluate other factors in an attempt to root out and eliminate potentially unreliable saliency features from the analysis.

Initially, in addressing the first manner of validation check noted above, in certain non-exclusive alternative embodiments, a saliency feature can be determined to have a small saliency metric value if the saliency metric value is approximately 0.01, 0.02, or 0.03. Alternatively, other saliency metric value thresholds can be utilized for determining whether a saliency metric value can be deemed to be a small saliency metric value. Additionally, in certain non-exclusive alternative embodiments, a saliency feature can be determined to relate to a very small high saliency cluster region if the applicable region is approximately 1.0%, 2.0%, or 3.0% of the total image size. Alternatively, other saliency cluster region size thresholds can be utilized for determining whether a saliency cluster region can be deemed to be a very small saliency cluster region. In application, for features determined (i.e. via the application of the appropriate threshold values) to have either very small saliency metric or very small high saliency cluster regions, this validation check includes checking if there exists supporting evidence from one or more good additional saliency features (for example, good additional saliency features may be features with saliency metric values higher than 0.02, but lower than 0.05, and with saliency cluster region size greater than 3.0% of the total image size; although other values may be used); and if not, invalidating these saliency features.

In addressing the second manner of validation check, i.e. related to the sharp/blur saliency feature, the validation check includes invalidating the sharp/blur saliency feature if its saliency metric is not very good, or if there exists other good features. For example, in certain non-exclusive alternative embodiments, the sharp/blur saliency feature can be deemed to be not very good if the saliency metric value is higher than 0.03, 0.04, 0.05, or some other appropriate value.

In step 711, the saliency features are sorted according to the calculated saliency metric value for each saliency feature. Subsequently, in one embodiment, the best four saliency features are chosen for purposes of detecting and/or extracting the main subject region of the image. Alternatively, greater than four or less than four saliency features can be chosen for purposes of detecting and/or extracting the main subject region of the image. It should be noted that the best feature is denoted by the lowest importance score, which is calculated by the equation:

$$\text{Importance\_score} = \text{compactness} * (1 - \text{spatial\_location\_weight}) \quad \text{(Equation 11)}$$

As noted, the lower the importance score, the higher the importance of the saliency feature, as this favors compactness and center location.

In step 713, a combined saliency map is generated based on a linear weighted sum of the most important, e.g., the four most important, saliency features. The saliency map is further generated by assigning weights to each of the applied saliency features according to the related importance score, such that the lower the importance score for the individual saliency features, the higher the actual importance of the saliency feature. Additionally, the lower the importance score, i.e. the higher the importance of the saliency feature, the greater importance that saliency feature has in the final determination of the combined saliency map.

It should be noted that in certain situations, this saliency feature analysis can lead to inaccurate or imprecise results because the saliency metric tends to favor features with small and compact high saliency clusters. In order to address this issue, in some embodiments, for features with very small high saliency clusters or very low saliency metric values, a validation check is performed where additional good saliency features are checked to determine if they provide supporting evidence for the accurate determination of the main subject region. Such good saliency features include features with low saliency metric scores and reasonably high cluster region size. For example, such good reliable saliency features can be features with a saliency metric value higher than 0.02, but lower than 0.04, and with a saliency cluster region size greater than 3.0% of the total image size; although other values may be used. Additionally, positive supporting evidence is provided where there is a threshold percentage of overlapping regions demonstrative of the main subject region. For example, positive supporting evidence can be found if the percentage of overlapping regions demonstrative of the main subject region is at least approximately 70%, 80%, or some other appropriate value.

Figure 7B:
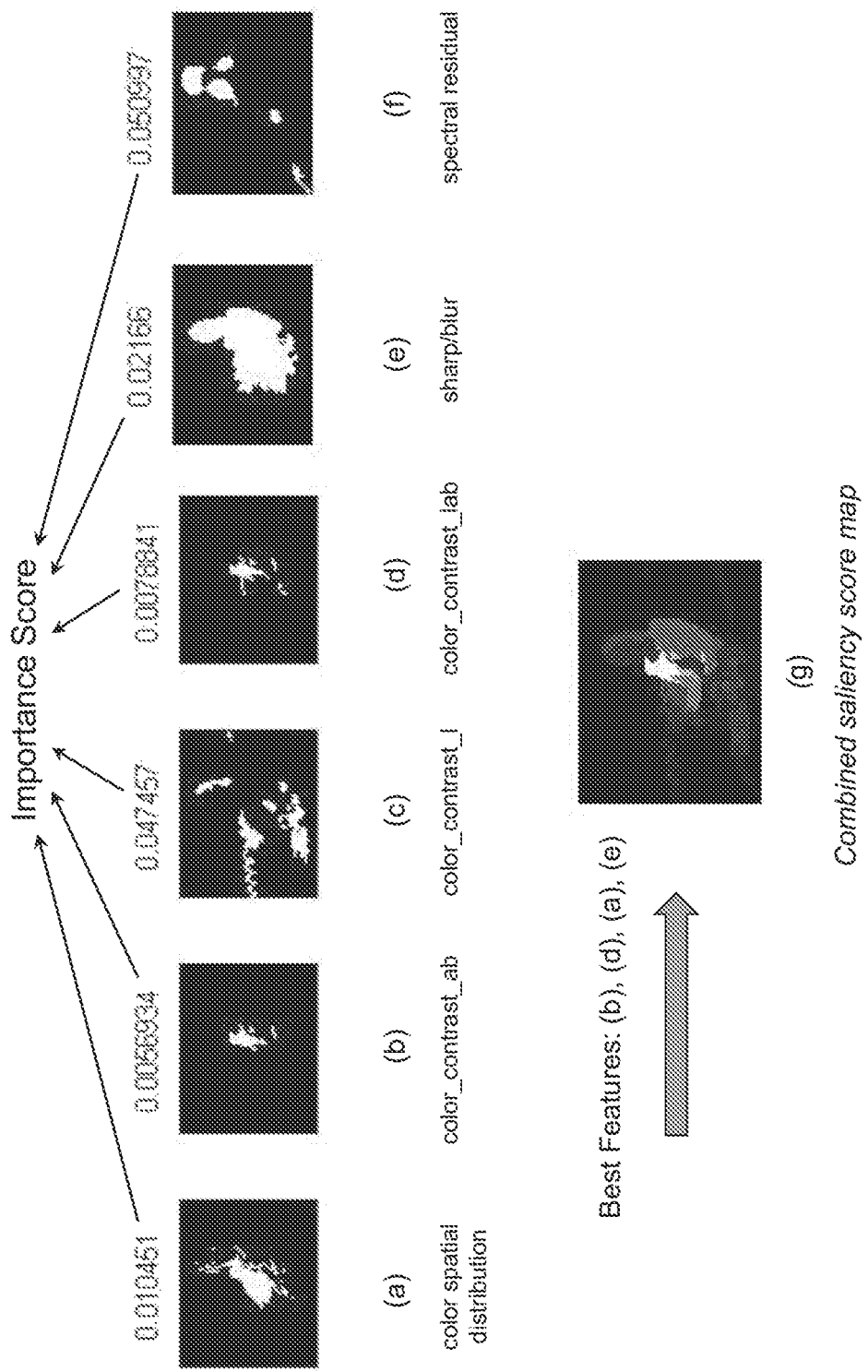
FIG. 7B is a pictorial representation of an example of an adaptive weighted combination of important saliency features as part of the measurement of the importance of saliency features and adaptively combining important saliency features of FIG. 7A.

FIG. 7B is a pictorial representation of an example of an adaptive weighted combination of important saliency features as part of the measurement of the importance of saliency features and adaptively combining important saliency features of FIG. 7A. In particular, along the top line in FIG. 7B, importance scores are shown for each of the computed saliency features. Additionally, at the bottom of FIG. 7B, the four best features as computed from the various importance scores, i.e. the color components saliency feature (A+B), the combined color contrast saliency feature (LAB), the color spatial distribution saliency feature, and the sharp/blur saliency feature in this particular example, are combined to provide a combined saliency score map.

Figure 8A:
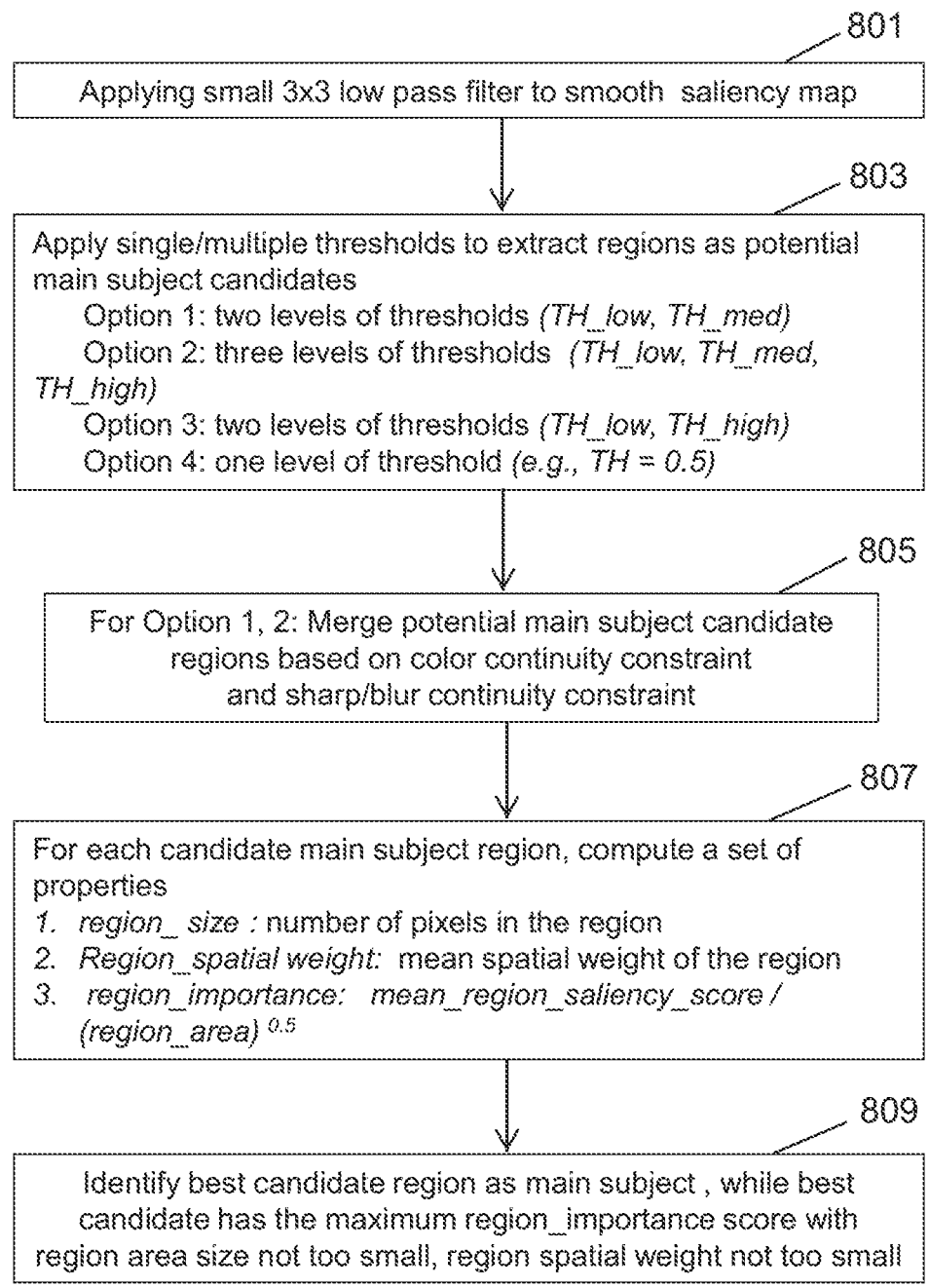
FIG. 8A is a flow chart that illustrates post-processing of the saliency map to extract the main subject as part of the stage 1 analysis of FIG. 4.

FIG. 8A is a flow chart that illustrates post-processing of the combined saliency score map to extract the main subject as part of the stage 1 analysis of FIG. 4. Post-processing of the combined saliency map, as described herein, functions to extract the main subject region from the combined saliency map, i.e. from the grayscale combined saliency map, with the goal of attaining high detection precision and also high recall.

In step 801, a filter can be applied to the combined saliency map in order to smooth the regions within the combined saliency map. For example, in one embodiment, a three by three low pass filter can be applied to smooth the regions within the combined saliency map. Alternatively, another appropriate filter can be applied to smooth the regions within the combined saliency map.

In step 803, one or more thresholds may be applied in order to extract one or more regions from the combined saliency map as potential main subject candidates. For example, in certain non-exclusive alternative embodiments, the main subject detection algorithm can apply (1) two levels of thresholds (TH_low, TH_med); (2) three levels of thresholds (TH_low, TH_med, TH_high); (3) two levels of thresholds (TH_low, TH_high), or (4) one level of threshold (TH=0.5).

Next, in optional step 805, for options (1) and (2) above, i.e. the two levels of thresholds (TH_low, TH_med) and/or the three levels of thresholds (TH_low, TH_med, TH_high), the main subject candidate regions may be merged based on color continuity constraints and sharp/blur continuity constraints. This effectively expands the size of the main subject candidate regions.

It should be noted that in certain instances, the main subject candidate regions (also referred to as the "main subject mask") also cover certain portions of the unwanted background region. Accordingly, in some embodiments, the post-processing can apply a single level of threshold, e.g., option (4) above with TH=0.5, with the goal of attaining higher detection precision. Moreover, in such embodiments, the merging/expanding process of step 805 that may be applied when applying multiple thresholds is skipped.

In step 807, a set of properties is computed for each identified main subject region candidate. For example, the properties that are computed can include one or more of the region size (i.e. the number of pixels in the main subject region candidate), the region spatial weight (i.e. the mean spatial weight of the main subject region candidate), and the region importance of the main subject region candidate (i.e. mean_region_saliency_score/(region_area)$^{0.5}$). Additionally and/or alternatively, additional appropriate properties may also be computed for each identified main subject region candidate.

Finally, in step 809, the best main subject region candidate is identified as the main subject of the image. In one embodiment, the best main subject region candidate is identified as the main subject region with the highest or maximum region importance score, provided the region area size and the region spatial weight are not viewed as being too small for accurate main subject region detection.

Figure 8B:
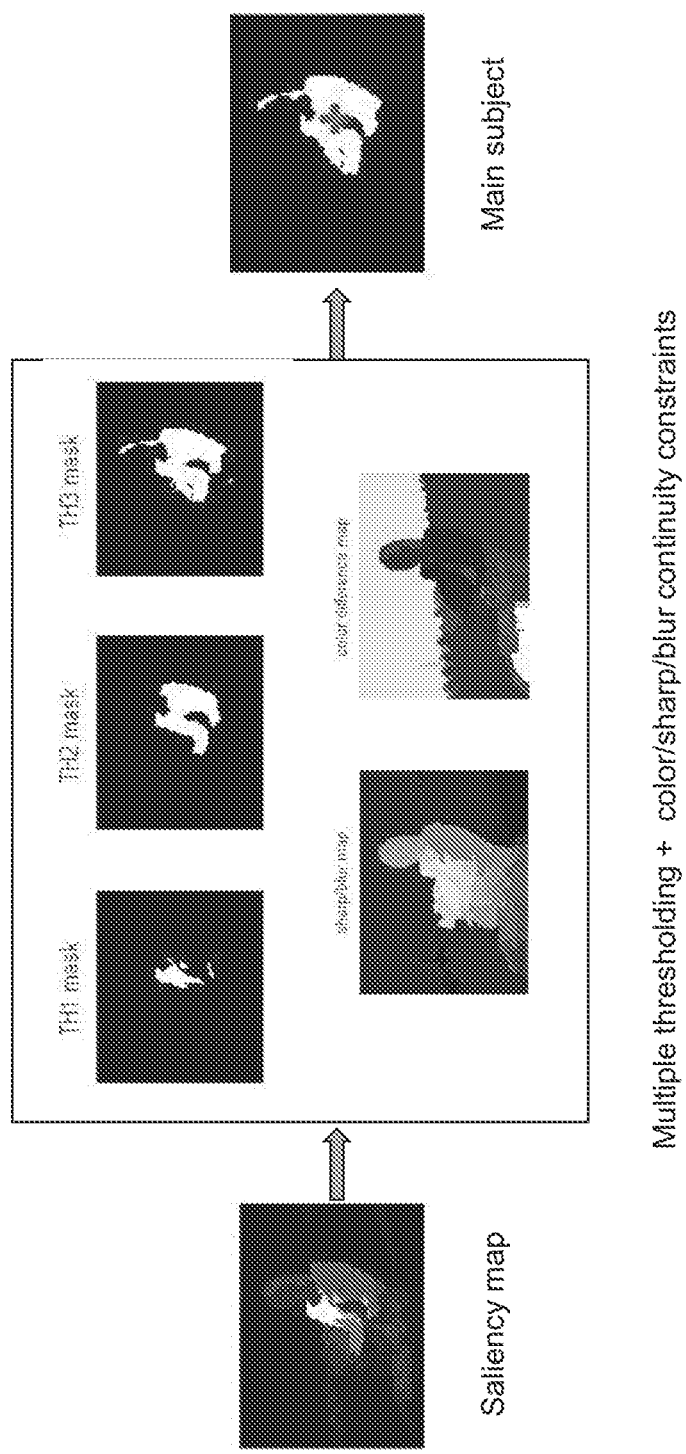
FIG. 8B is a pictorial representation of an example of an extraction of a main subject from post-processing of a saliency map as part of the post-processing of the saliency map of FIG. 8A.

FIG. 8B is a pictorial representation of an example of an extraction of a main subject from post-processing of a saliency map as part of the post-processing of the saliency map of FIG. 8A. In particular, on the left side of FIG. 8B is illustrated the combined saliency score map that was generated in step 713 above; in the center of FIG. 8B are various examples of post-processing steps being applied to the combined saliency score map (e.g., post-processing through application of multiple thresholding and color continuity and sharp/blur continuity constraints); and on the right side of FIG. 8B is illustrated the main subject that has been identified (and extracted) as the best main subject region candidate in step 809.

Figure 9:
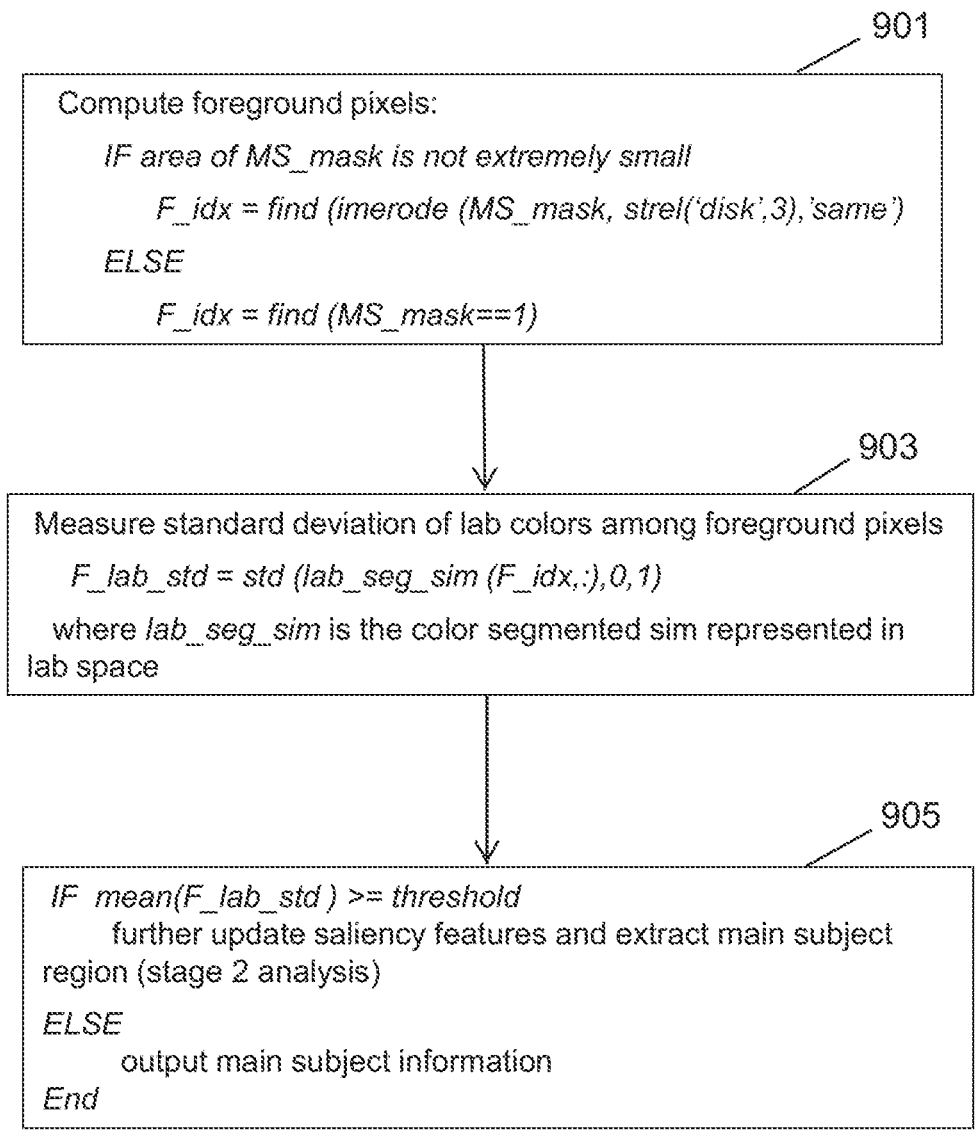
FIG. 9 is a flow chart that illustrates analyzing of the extracted main subject region from the stage 1 analysis in accordance with the main subject detection algorithm of FIG. 2.

FIG. 9 is a flow chart that illustrates analyzing of the extracted main subject region from the stage 1 analysis in accordance with the main subject detection algorithm 200 of FIG. 2. In particular, FIG. 9 illustrates the process for analyzing the extracted main subject region obtained from the stage 1 analysis, to determine if a refined or updated analysis is necessary and/or appropriate.

In step 901, the foreground pixels are computed to evaluate if the total of the area of the main subject mask is extremely small. For example, in one embodiment, the total area of the main subject mask is determined to be extremely small if the total area is less than or equal to two percent of the total image area. Alternatively, the threshold for determining if the total area of the main subject mask is extremely small can be greater than or less than two percent of the total image area. In one embodiment, if the area of the main subject mask is determined to be not extremely small, then a function is utilized such that F_idx=find (imerode (MS_mask, strel('disk',3),'same'). Otherwise, if the area of the main subject mask is determined to be extremely small, then a function is utilized such that F_idx=find (MS_mask==1).

Next, in step 903, the standard deviation of the LAB colors among the foreground pixels is measured utilizing the function:

$F\_lab\_std = std(lab\_seg\_sim(F\_idx,:),0,1)$, where lab_seg_sim is the color segmented image (sim) represented in the LAB space.

Then, in step 905, a predetermined threshold value is applied to evaluate whether further updating and refining of the extracted main subject region is necessary and/or appropriate. In particular, the mean standard deviation of the LAB colors among the foreground pixels is compared to a predetermined threshold value. In one embodiment, if the mean standard deviation of the LAB colors among the foreground pixels is greater than or equal to the predetermined threshold value, then the stage 2 analysis is undertaken, with the saliency features being further updated for purposes of extracting the main subject region. Conversely, if the mean standard deviation of the LAB colors among the foreground pixels is less than the predetermined threshold value, then the extracted main subject region from the stage 1 analysis is determined to be accurate, and the extracted main subject region and other relevant information is outputted.

Figure 10:
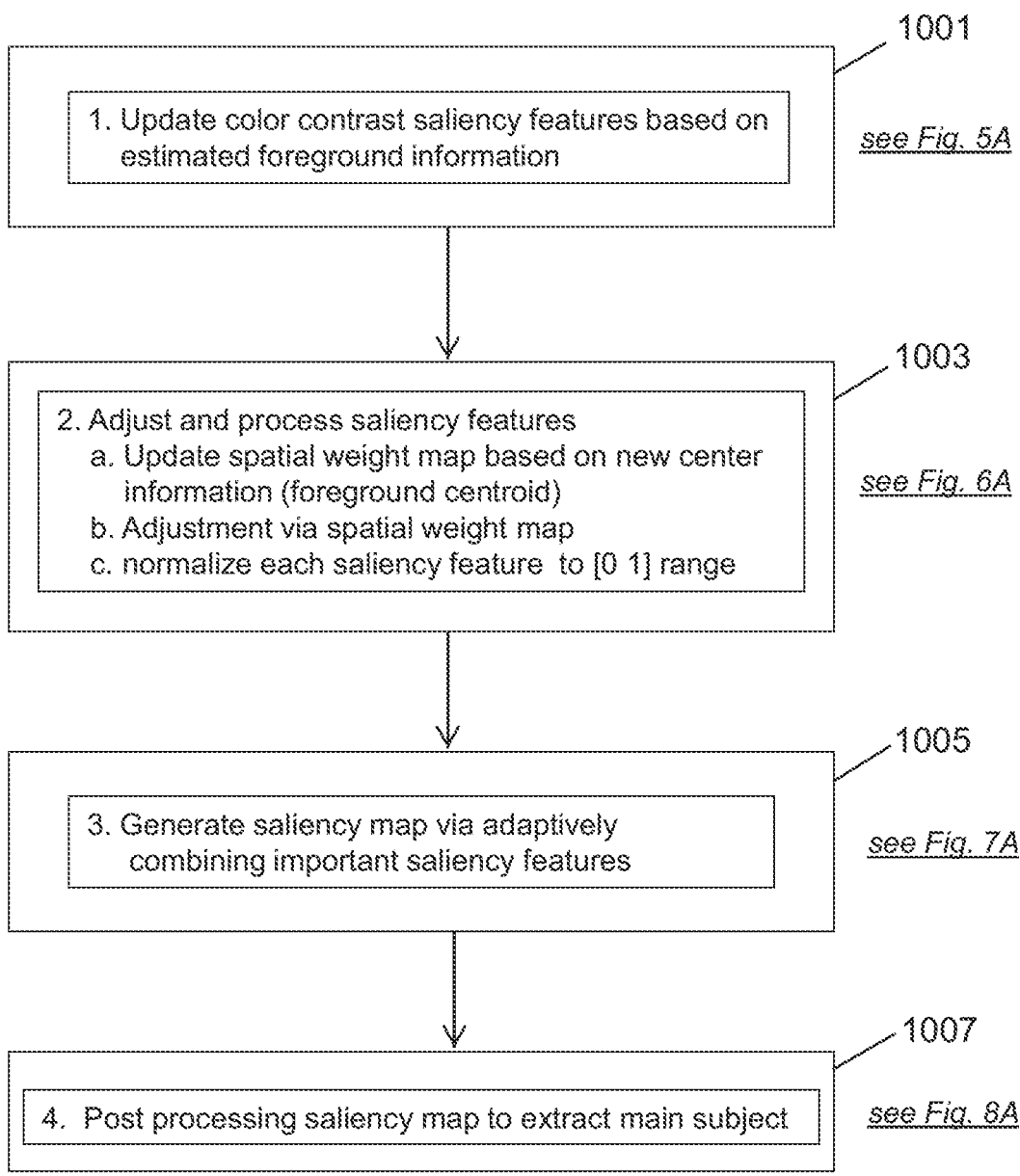
FIG. 10 is a flow chart that illustrates a stage 2 analysis for updating saliency features and extracting the main subject region in accordance with the main subject detection algorithm of FIG. 2.

FIG. 10 is a flow chart that illustrates a stage 2 analysis for updating saliency features and extracting the main subject region in accordance with the main subject detection algorithm 200 of FIG. 2. The overall process of the stage 2 analysis is substantially similar to the overall process of the stage 1 analysis. Accordingly, the details of each step will not be repeated. However, in the stage 2 analysis, the focus is on the foreground region that is related to the estimated main subject as identified in the stage 1 analysis.

It should be noted that the means for identifying and/or extracting the foreground pixels can be varied for purposes of pursuing the stage 2 analysis. In particular, in certain embodiments, the imerode is only selectively applied to the main subject mask in order to extract the foreground pixels for purposes of the stage 2 analysis. In such embodiments, the imerode can be skipped when the main subject mask area is relatively small, e.g., when the main subject mask area is less than two percent of the total image size.

In step 1001, the color contrast saliency features are updated based on the identification of the estimated foreground information. The process for updating the color contrast saliency features is substantially similar to the process described above in step 507 in FIG. 5A, with the focus now being on the identified foreground region instead of distinguishing from the background region.

In step 1003, the saliency features are adjusted and processed in a manner substantially similar to that identified and described above in relation to FIG. 6A. In particular, in one embodiment, the adjustment and processing of the saliency features in the stage 2 analysis can include updating the spatial weight map based on the new center information, i.e. based on the foreground centroid (see step 603); adjusting the saliency features via the spatial weight map (see step 605); and normalizing each saliency feature to the [0 1] range (see step 607). In certain embodiments, the updating of the spatial weight map in the stage 2 analysis can be modified in order to favor the identified main subject region from the stage 1 analysis. In one embodiment, the spatial weight map is updated only based on the distance to the centroid of the identified main subject region. Alternatively, in one embodiment, slightly more weight may be added to the main subject regions that have been identified by the stage 1 analysis. In particular, the following equations may be applied in such situations:

$$spatial\_weight = spatial\_weight + 0.5*MSD\_map\_mask$$

$$spatial\_weight = spatial\_weight./max(spatial\_weight(:)).$$

In step 1005, a saliency map is generated via adaptively combining the important saliency features in a manner substantially similar to that identified and described above in relation to FIG. 7A.

Finally, in step 1007, post-processing of the saliency map is undertaken to extract the main subject region from the combined saliency map in a manner substantially similar to that identified and described above in relation to FIG. 8A. Then, the identified main subject region from the stage 2 analysis and other relevant information is outputted.

While a number of exemplary aspects and embodiments of a main subject detection algorithm 200 and method have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for detecting a main subject in an image, the image including a plurality of image segments, the method comprising the steps of:
computing a plurality of saliency features from the image with a control system, the plurality of saliency features including at least two of (i) a sharp/blur saliency feature, (ii) a spectral residual saliency feature, (iii) a color spatial distribution saliency feature, and (iv) one or more color contrast saliency features;
generating a spatial weight map for each of the plurality of image segments with the control system;
adjusting the plurality of saliency features via the spatial weight map to generate a plurality of adjusted saliency features;
combining at least two of the plurality of adjusted saliency features to generate a saliency map of the image;
extracting the main subject from the saliency map of the image;
analyzing the main subject that is extracted from the saliency map of the image by computing the standard deviation of the one or more color contrast saliency features; and
determining if the extracted main subject needs to be refined by comparing the standard deviation of the one or more color contrast saliency features to a predetermined threshold value to determine if the extracted main subject needs to be refined.

2. The method of claim 1 wherein the step of computing includes the plurality of saliency features including at least three of (i) the sharp/blur saliency feature, (ii) the spectral residual saliency feature, (iii) the color spatial distribution saliency feature, and (iv) the one or more color contrast saliency features.

3. The method of claim 1 wherein the step of computing includes the plurality of saliency features including each of (i) the sharp/blur saliency feature, (ii) the spectral residual saliency feature, (iii) the color spatial distribution saliency feature, and (iv) the one or more color contrast saliency features.

4. The method of claim 1 wherein the step of combining includes the steps of computing a saliency metric for each of the plurality of adjusted saliency features; performing a validation check on one or more of the plurality of adjusted saliency features; and invalidating any adjusted saliency features that do not pass the validation check to provide a list of validated adjusted saliency features.

5. The method of claim 4 wherein the step of performing the validation check includes checking one or more additional adjusted saliency features for supporting evidence that the one or more adjusted saliency features accurately identify the main subject.

6. The method of claim 4 wherein the step of combining further includes calculating an importance score for each of the validated adjusted saliency features; selecting at least two of the validated adjusted saliency features having the lowest importance scores; and combining the at least two of the validated adjusted saliency features to generate the saliency map of the image.

7. The method of claim 1 wherein if it is determined that the extracted main subject needs to be refined, then the method further comprises the steps of updating the plurality of saliency features to generate a plurality of updated saliency features, and extracting the main subject from the image based on the plurality of updated saliency features.

8. The method of claim 7 wherein the step of updating includes the step of updating the one or more color contrast saliency features based on estimated foreground information.

9. The method of claim 7 wherein the step of updating includes the steps of (i) updating the spatial weight map to provide an updated spatial weight map for each of the plurality of image segments with the control system, (ii) adjusting the plurality of updated saliency features via the updated spatial weight map to generate a plurality of adjusted updated saliency features, and (iii) combining at least two of the plurality of adjusted updated saliency features to generate an updated saliency map of the image.

10. The method of claim 1 further comprising the step of preprocessing the image with the control system by applying a color segmentation algorithm to the image to generate the plurality of image segments from the image that are based on color, and one or more of (i) downsampling the image, (ii) converting the color image to a grayscale image, and (iii) converting the image from an RGB image to an LAB image.

11. The method of claim 1 wherein the step of extracting includes the step of post-processing the saliency map of the image with the control system to extract the main subject from the saliency map of the image.

12. The method of claim 1 wherein the one or more color contrast saliency features include a lightness saliency feature, a color components saliency feature, and an LAB saliency feature.

* * * * *

UNITED STATES PATENT AND TRADEMARK OFFICE
CERTIFICATE OF CORRECTION

PATENT NO. : 9,619,708 B2
APPLICATION NO. : 14/387528
DATED : April 11, 2017
INVENTOR(S) : Li Hong It is certified that error appears in the above-identified patent and that said Letters Patent is hereby corrected as shown below:

On the Title Page

At item (73) Assignee name, replace "NIKO CORPORATION (JP)" with --NIKON CORPORATION (JP)--

Signed and Sealed this
Sixth Day of June, 2017

Michelle K. Lee
*Director of the United States Patent and Trademark Office*